(12) United States Patent
Mullaney et al.

(10) Patent No.: US 10,776,424 B2
(45) Date of Patent: Sep. 15, 2020

(54) SYSTEM AND METHOD FOR IDENTIFYING AND RANKING TRENDING NAMED ENTITIES IN DIGITAL CONTENT OBJECTS

(71) Applicant: NewsWhip Media Limited, Dublin (IE)

(72) Inventors: Andrew Mullaney, Dublin (IE); Bojan Furlan, Dublin (IE); Katrin Braunschweig, Dublin (IE)

(73) Assignee: Newswhip Media Limited, Dublin (IE)

( * ) Notice: Subject to any disclaimer, the term of this patent is extended or adjusted under 35 U.S.C. 154(b) by 432 days.

(21) Appl. No.: 15/664,563

(22) Filed: Jul. 31, 2017

(65) Prior Publication Data

US 2018/0032636 A1 Feb. 1, 2018

Related U.S. Application Data

(60) Provisional application No. 62/368,668, filed on Jul. 29, 2016.

(51) Int. Cl.

| | | |
|---|---|---|
| *G06F 16/90* | (2019.01) | |
| *G06Q 50/00* | (2012.01) | |
| *G06N 5/02* | (2006.01) | |
| *H04L 12/58* | (2006.01) | |
| *G06K 9/62* | (2006.01) | |
| *G06K 9/00* | (2006.01) | |
| *G06F 16/951* | (2019.01) | |
| *G06F 16/33* | (2019.01) | |
| *G06F 40/295* | (2020.01) | |

(52) U.S. Cl.
CPC .......... *G06F 16/90* (2019.01); *G06F 16/3344* (2019.01); *G06F 16/951* (2019.01); *G06F 40/295* (2020.01); *G06K 9/00496* (2013.01); *G06K 9/628* (2013.01); *G06N 5/022* (2013.01); *G06Q 50/01* (2013.01); *H04L 51/32* (2013.01); *H04L 51/34* (2013.01)

(58) Field of Classification Search
None
See application file for complete search history.

(56) References Cited

U.S. PATENT DOCUMENTS

| | | | |
|---|---|---|---|
| 7,761,437 B2 * | 7/2010 | Tsuzuki | G06F 17/278 707/705 |
| 2016/0055164 A1 * | 2/2016 | Cantarero | G06F 16/447 707/740 |
| 2016/0314477 A1 * | 10/2016 | Ha | G06F 16/284 |

* cited by examiner

*Primary Examiner* — Belix M Ortiz Ditren
(74) *Attorney, Agent, or Firm* — Ohlandt, Greeley, Ruggiero & Perle, L.L.P.

(57) ABSTRACT

A method and a system for natural language processing of digital content objects, such as news stories, which ranks named entities in digital content objects by the impact that digital content objects that mention them are having on social media, is provided. Digital content objects are scored on a per object basis based on social media activity metrics associated with that digital content object. Named entities that appear in each digital content object are also extracted through natural language analysis. The named entities are then scored on a per entity basis to obtain an entity score that the object scores of those digital content objects in which that named entity appears. An entity ranking list can be created based on the entity scores, which can then be used in various different ways. For example, the entity ranking list can be displayed on a graphical user interface.

26 Claims, 13 Drawing Sheets

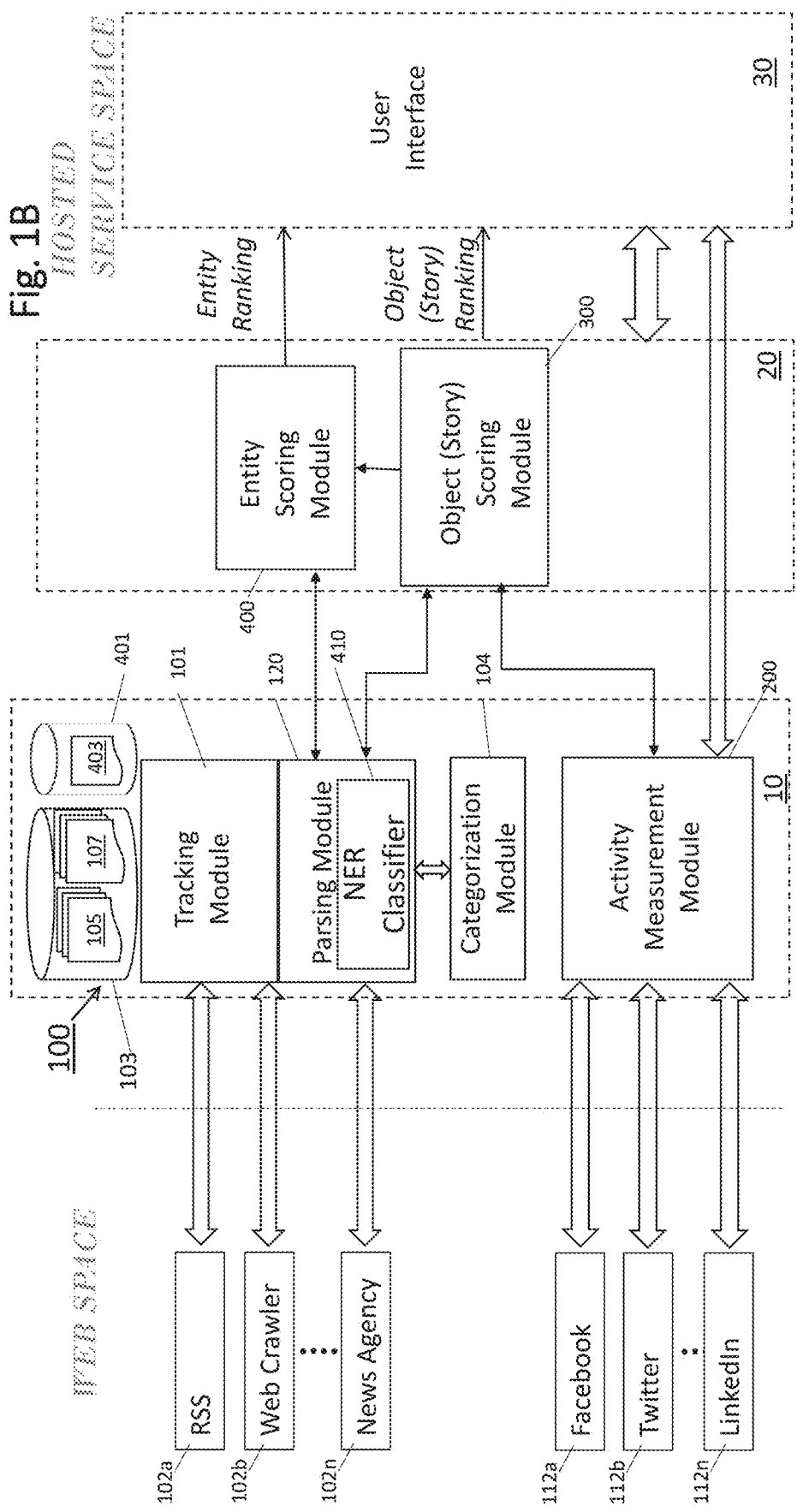

SYSTEM AND METHOD FOR IDENTIFYING AND RANKING TRENDING NAMED ENTITIES IN DIGITAL CONTENT OBJECTS

CROSS REFERENCE TO RELATED APPLICATIONS

The present application claims priority to U.S. Provisional Patent Application No. 62/368,668, filed on Jul. 29, 2016, the entirety of which is incorporated by reference hereby.

BACKGROUND OF THE DISCLOSURE

1. Field of the Disclosure

The present disclosure relates to a system and a method for identifying and ranking trending named entities. The present disclosure further relates to such a system and a method for identifying and ranking trending named entities in digital content objects.

2. Description of the Related Art

Social media impact is measured by how much the story is trending, for instance, by counting the numbers of shares, tweets and other engagements that a digital content object, for example a news story, has attracted over a given period of time. For Facebook®, these engagements can mean a share, like or comment; for Twitter®, a tweet or retweet of a link; and for LinkedIn®, a share of the content. Other social network platforms use similar indicia by which user engagement with a digital content object can be registered and tracked.

Tracking and measuring social media user engagements alone does not reveal anything about the content of the digital object itself, other than the degree to which it is trending among users of the platform. In other words, ranking of digital objects is content agnostic. As such, tracking and measuring social network engagements alone does not identify which entities in the content of the digital object content—for example a particular celebrity or political figure in a news story—are trending.

Natural language processing (NLP) is a field of computer science, artificial intelligence (AI), and computational linguistics concerned with the interactions between computers and human (natural) languages. As such, NLP has traditionally been related to the area of direct human-computer interaction, for example in Interactive Voice Response systems or text-to-speech recognition by a computer. One AI data analysis approach is based on identifying named entities from the natural language elements of digital data. Named entities are persons, organizations, locations or other text elements that can be located and classified into predefined categories. Named-entity recognition (NER), also known as entity identification and entity extraction, is an AI task that seeks to locate these text elements in a stream of text and classify them.

An NER system applies a model to a set of training data using machine learning techniques. Namely, before first use on unknown digital data, the NER system learns how to operate by applying itself to a large amount of manually annotated training data. Then, the NER system can be employed to extract named entities from longer text items.

The prior art discloses a method for analyzing a search engine query to determine those named entities that are the most suitable for input into a search engine to satisfy the query. The ranking model ranks the named entities based on relevance between the query features and corresponding entity features of each named entity. The ranking model includes user context in the ranking, e.g. taking account of user location and a time line of events that link the content of the query to features of the named entities that are mentioned in the query. However, if user-context based ranking does not work for some reason, the ranking model defaults to a popularity ranking of the named entities based on search history of the general population.

Other prior art discloses a ranking scheme that runs inside a messaging application. When a conversation takes place in the messaging application, the text is analyzed to extract named entities that are mentioned in the conversation. The named entities are then ranked according to their frequency in the conversation, specifically how often a particular named entity is mentioned in the conversation divided by the total number of mentions of all named entities in the conversation.

SUMMARY OF THE DISCLOSURE

The following briefly describes a basic understanding of some aspects of the present embodiments.

In at least one embodiment, there is provided a method for processing of one or more digital content objects with each digital content object including a natural language element, the method being performed by a computer system that comprises one or more processors and a computer-readable storage medium encoded with instructions executable by at least one of the processors and operatively coupled to at least one of the processors, the method comprising:

determining one or more object scores on a per object basis for the one or more digital content objects with an object scoring module, the object scoring module including machine readable object scoring code which, when executed on the computer, determines on a per object basis an object score for each digital content object, wherein the object score is based on a value of at least one social media activity metric associated with the digital content object on at least one social network;

executing a named entity recognition (NER) classifier to extract on a per object basis one or more named entities that appear in each digital content object through analysis of its natural language element;

inputting the object scores determined by the object scoring module into an entity scoring module, the entity scoring module comprising machine readable entity ranking code;

inputting the named entities extracted on a per object basis by the NER classifier into the entity scoring module, and executing the entity ranking code to:
calculate on a per entity basis an entity score that aggregates the object scores of those digital content objects in which that named entity appears; and
sort the entity scores to provide an entity ranking list; and
sort the final entity scores to provide an entity ranking list; and
outputting the entity ranking list from the entity scoring module to a user interface.

In at least one embodiment, the method can further comprise determining on a per object basis an object score for each of a plurality of digital content objects from a batch of the digital content objects; and inputting into the entity scoring module, for each of the batch of digital content objects, the object scores determined by the object scoring module.

In at least one embodiment, the method can further comprise excluding the named entities from the ranking that appears in no more than a threshold number of the digital content objects.

In at least one embodiment, the entity score that aggregates the object scores can include a sum of the object scores of those digital content objects in which the same named entity appears. In an embodiment, the entity score is a normalized entity score. For example, the normalized entity score can comprise the sum of the object scores be divided by a sum of all the object scores for the digital content objects in a predetermined time period. In an embodiment, the normalized entity score can comprise a sum of the object scores divided by a sum of object scores for the digital content objects in which a named entity from the entity ranking list appears. In at least one embodiment the method can further comprise calculating a change between the current time frame and a preceding time frame. In at least one embodiment, the method can include:

determining one or more current object scores for a current time frame;
calculating the one or more current entity scores;
determining one or more historical object scores from a preceding time frame;
calculating the one or more historical entity scores;
calculating an entity trend score on a per entity basis from the current entity score for the entity and the historical entity score for the entity, the entity trend score being calculated to measure a trend between the current time frame and the previous time fame; and
sorting the trend entity scores to provide the entity ranking list.

In an embodiment, the calculating of the entity trend score can comprise: dividing the current entity score for the entity by the preceding entity score for the entity. In an embodiment, calculating the trend score can include dividing a normalized current entity score for the current time frame with a normalized historical entity score for the preceding time frame. In an embodiment, the calculation of the trend between the current time frame entity score and the preceding time entity score can be selected from the group of: a ratio, a difference, and percentage increase.

In at least one embodiment, the natural language elements of the one or more digital content objects can include a summary portion and a main body portion, and the extracting step is based solely on the summary portion.

In at least one embodiment, the social media activity metric can be selected from the group of: a share, a like, a comment, a tweet of a hyperlink, a retweet of a hyperlink, an aggregate engagement metric for different social media metrics, and any combinations thereof.

In at least one embodiment, the object score can be based on size of the social media activity metric over a defined period of time. In at least one embodiment, the object score can be based on change of the social media activity metric over at least two defined periods of time. In at least one embodiment, the object score is based on a change of the social media activity metric over at least three defined periods of time.

In at least one embodiment, the entity ranking list can be confined to a maximum number of entities.

In at least one embodiment, the object scoring module can send a per object query to at least one social network and request a return of a value for at least one social media activity metric, and wait to receive a query reply containing a per object value for each of the at least one social media activity metrics.

In at least one embodiment, the method can include:
receiving one or more additional digital content objects;
determining one or more additional object scores on a per object basis for the one or more digital content objects;
inputting the one or more additional object scores determined by the object scoring module into the entity scoring module;
extracting on a per object basis one or more named entities that appear in each additional digital content object through analysis of its natural language element with the NER classifier;
inputting the one or more additional object scores determined by the object scoring module into the entity scoring module; and
executing the entity ranking code to:
recalculate on a per entity basis an entity score that aggregates the object scores of the digital content objects in which that named entity appears;
sort the entity scores to provide an updated entity ranking list; and
output the updated entity ranking list from the entity scoring module.

In at least one embodiment, the method can further include:
recalculating one or more of the object scores that were determined by the object scoring module before receiving the one or more additional object scores;
inputting the one or more recalculated object scores determined by the object scoring module into the entity scoring module; and
executing the entity ranking code to update the previously determined object scores with the recalculated object scores before recalculating the entity score.

In at least one embodiment, the method can comprise:
determining one or more new current object scores for the additional digital content objects for a current time frame;
recalculating the one or more current entity scores;
determining one or more new historical object scores from a preceding time frame;
recalculating the one or more historical entity scores;
recalculating an entity trend score on a per entity basis from the recalculated current entity score for the entity and the recalculated historical entity score for the entity; and
sorting the trend entity scores to provide an updated entity ranking list.

In at least one embodiment, the NER classifier is included in a parsing engine or the entity ranking module of the trending module.

In at least one embodiment, the present disclosure also provides a computer system for analyzing digital content objects, each digital content object including a natural language element, the computer system comprising:
a data collection unit configured to collect social media data from social media platforms and a plurality of digital content objects from digital content object sources;
a trending unit configured to analyze the plurality of digital content objects with an object scoring module and an entity scoring module; and
an (NER) classifier configured to extract on a per object basis one or more named entities that appear in each digital content object through analysis of its natural language element;

an operative connection to a user interface unit, wherein:

the object scoring module includes machine readable object scoring code which, when executed on the computer system, determines on a per object basis an object score for each of the digital content objects, wherein the object score is based on a value of at least one social media activity metric associated with that digital content object in at least one social network; and the NER classifier executes code configured to extract on a per object basis one or more named entities that appear in each digital content object through analysis of its natural language element;

the entity scoring module includes machine readable entity scoring code which, when executed on the computer system, receives the object scores determined by the object scoring module;

receives the named entities extracted on a per object basis;

determines on a per entity basis an entity score that aggregates the object scores of the digital content objects in which that named entity appears; and sorts the entity scores to provide an entity ranking list; and the user interface unit is operable receive the entity ranking list from the entity scoring module.

In at least one embodiment, the user interface unit includes user-configurable trending filters that permit users to: adjust how object scores and entity scores are determined; or define the batch of digital content objects to be analyzed by the trending unit; or both. In at least one of the various embodiments, the NER classifier is included in a parsing engine of the data collection unit or the entity ranking module.

In at least one embodiment, the present disclosure further provides a computer program product containing machine-readable code, which when executed on a computer system is operable to analyze a batch of digital content objects by natural language processing, each digital content object including a natural language element, the machine-readable code comprising:

object scoring code which, when executed on a computer system, determines on a per object basis an object score for each of the digital content objects in the batch, wherein the object score is based on a value of at least one social media activity metric associated with that digital content object in at least one social network;

an NER classifier which, when executed on a computer system, executes code configured to extract on a per object basis one or more named entities that appear in each digital content object through analysis of its natural language element; and entity scoring code comprising machine readable code which, when executed on a computer system, receives the object scores determined by the object scoring module;

receives the named entities extracted on a per object basis by the NER classifier;

determines, on a per entity basis, an entity score that aggregates the object scores of the digital content objects in which that named entity appears;

sorts the entity scores to provide an entity ranking list; and outputs the entity ranking list.

In at least one embodiment, the present disclosure still further provides a computer system comprising:

a trending unit configured for natural language processing, the trending unit comprising an object scoring module including machine readable digital content object scoring code which, when executed on the computer system, at least determines on a per object basis an object score for a digital content object, wherein the object score is based on a value of at least one social media activity metric associated with that digital content object in at least one social network;

an NER classifier which, when executed on a computer system, executes code configured to extract on a per object basis one or more named entities that appear in each digital content object through analysis of its natural language element; and an entity scoring module comprising machine readable code, the entity scoring module code being configured to, when executed on the computer system, at least:

receive the object scores determined by the object scoring module;

receive the named entities extracted on a per object basis by the NER classifier;

determine, on a per entity basis, an entity score; and sort the entity scores to provide an entity ranking list.

In at least one embodiment, the trending unit can further comprise: the object scoring module including machine readable digital content object scoring code which, when executed on the computer system, at least determines one or more additional object scores on a per object basis for one or more additional digital content objects; the entity ranking module being configured to receive the one or more additional object scores determined by the object scoring module into the entity scoring module; and an NER classifier which, when executed on a computer system, executes code configured to extract on a per object basis one or more named entities that appear in each digital content object through analysis of its natural language element; and the entity ranking module code being configured to, when executed on the computer system, at least:

(i) receive the named entities extracted on a per object basis by the NER classifier;

(ii) calculate on a per entity basis an entity score that aggregates the object scores of the digital content objects in which that named entity appears; and (iii) sort the entity scores to provide an updated entity ranking list; and (iv) outputting the updated entity ranking list from the entity scoring module.

In at least one embodiment, the trending unit can further comprise: the entity scoring module code being configured to, when executed on the computer system, recalculate one or more of the previously determined object scores and input the one or more recalculated object scores determined by the object scoring module into the entity scoring module; and the entity ranking module code being configured to, when executed on the computer system, update the previously determined object scores with the recalculated object scores before recalculating the entity score.

In at least one embodiment, the entity score that aggregates the object scores can include a sum of the object scores of those digital content objects in which the same named entity appears. In an embodiment, the entity score is a normalized entity score. For example, the normalized entity score can comprise the sum of the object scores divided by a sum of all the object scores for the digital content objects in a predetermined time period. In an embodiment, the normalized entity score can comprise a sum of the object scores divided by a sum of object scores for the digital content objects in which a named entity from the entity ranking list appears. In at least one embodiment, the system can further comprise code that calculates a change between the current time frame and a preceding time frame. In at least one embodiment, the trending unit can be configured to:

determine one or more current object scores for a current time frame;

calculate the one or more current entity scores;

determine one or more historical object scores from a preceding time frame;

calculate the one or more historical entity scores;

calculate an entity trend score on a per entity basis from the current entity score for the entity and the historical entity score for the entity, the entity trend score being calculated to measure a trend between the current time frame and the previous time fame; and sort the trend entity scores to provide the entity ranking list.

In an embodiment, the calculating of the entity trend score can comprise: dividing the current entity score for the entity by the preceding entity score for the entity. In an embodiment, the calculating the trend score can include dividing a normalized current entity score for the current time frame with a normalized historical entity score for the preceding time frame. In an embodiment, the calculation of the trend between the current time frame entity score and the preceding time entity score can be selected from the group of: a ratio, a difference and percentage increase.

BRIEF DESCRIPTION OF THE DRAWINGS

Embodiments will now be further described, by way of example only, with reference to the accompanying drawings.

FIGS. 1A and 1B are block diagrams of logical architectures of a digital content object analysis system according to embodiments of the present disclosure.

DETAILED DESCRIPTION OF THE PREFERRED EMBODIMENTS

Figure 1A:
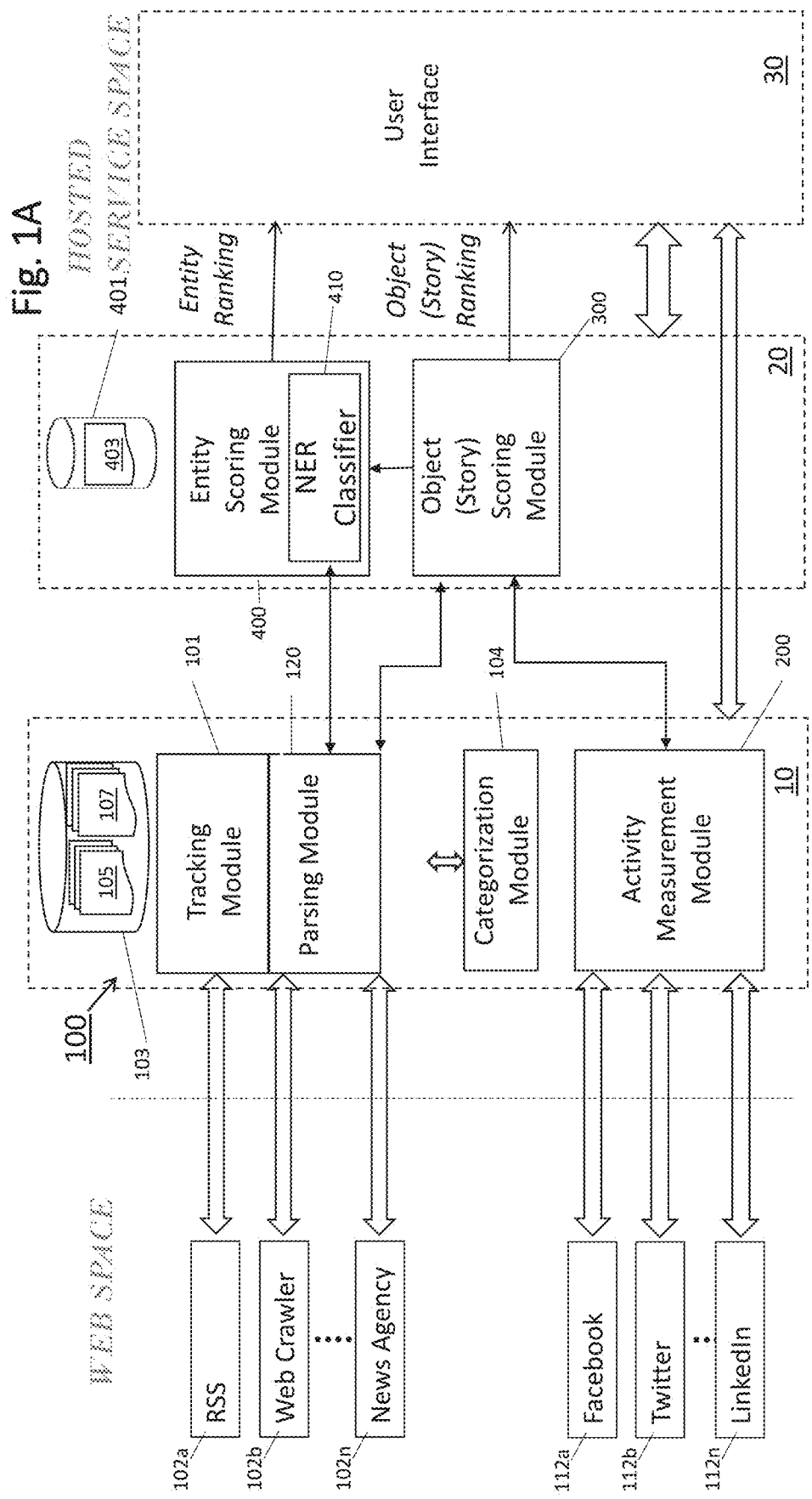

Various embodiments now will be described more fully hereinafter with reference to the accompanying drawings, which form a part hereof, and which show, by way of illustration, specific embodiments by which the present disclosure can be practiced. The embodiments can, however, be embodied in many different forms and should not be construed as limited to the embodiments set forth herein. Rather, these embodiments are provided so that this disclosure will be thorough and complete, and will fully convey the scope of the embodiments to those skilled in the art. Among other things, the various embodiments can be methods, systems, media, or devices. Accordingly, the various embodiments can take the form of an entirely hardware embodiment, an entirely software embodiment, or an embodiment combining software and hardware aspects. The following detailed description is, therefore, not to be construed in a limiting sense.

Throughout this application, the following terms take the meanings explicitly associated herein, unless the context clearly dictates otherwise. The term "herein" refers to the specification, claims, and drawings associated with this application. The phrase "in one embodiment" or "in an embodiment" as used herein does not necessarily refer to the same embodiment, though it may. Furthermore, the phrase "in another embodiment" as used herein does not necessarily refer to a different embodiment, although it may. Thus, as described below, various embodiments of the present disclosure can be readily combined, without departing from the scope or spirit of the present disclosure.

In addition, as used herein, the term "or" is inclusive, and is equivalent to the term "and/or" unless the context clearly dictates otherwise. The term "based on" is not exclusive and allows for additional factors to be included that are not described, unless the context clearly dictates otherwise. In addition, throughout the application, the meaning of "a" "an" and "the" include plural references. The meaning of "in" includes "in" and "on".

In the following detailed description, digital content objects are described in terms of news feeds and as news stories. Examples of news story types are: journalistic articles, online reviews, blogs, posts, conversations, and natural language content of videos. It will be understood that embodiments can be applied to other digital content objects including a natural speech element or having a natural speech element derived therefrom and capable of being scored and ranked in the manner described.

A digital content object in the context of embodiments includes an element of natural language, e.g. as text or speech subject to AI natural language processing, which can contain named entities. A NER classifier is trained and configured to classify named entities into categories; typical categories for named entities include: persons, organizations, locations and miscellaneous. A digital content object can also be associated with content in addition to the natural language element, e.g. pictures, video content, audio content, metadata and so forth.

A digital content object including a natural language element includes digital content objects that can have natural language text element derived therefrom. Thus, a digital content object will most usually be stored as words in a text data document, but is not restricted to natural language text source material. For example, a digital content object can be sourced from audio files or video files using speech recognition technology for speech-to-text transcription or video analysis technology for lip-reading transcription to text. Thus, natural language element of a digital content object from speech or singing can be extracted into text by speech recognition software from combined video and audio data or from audio data without video. Text can be extracted from video without audio by video analysis technology for lip-reading transcription to text.

Referring to FIG. 1A, the digital content object system is generally represented by reference numeral 100. Embodiments herein are shown as digital news story analysis system 100 according to an embodiment together with associated external elements. As noted herein, although embodiments are described using news stories as digital content objects, the system 100 can be used for any form of digital content objects that are sourced to the system 100 and engaged via social media platforms 112*n*. The right hand portion of the FIG. 1A, bounded by vertical dashed line, and labelled as the hosted service space, shows operational modules of the system. The left-hand portion, labelled web space, shows sources of digital content objects—news stories—as well as the social media platforms that engage with those news stories which are on the Internet. The digital content object sources and social media platforms also exist in another information space, such as a company intranet, where documents and other content are identified by URLs interlinked by hypertext links (hyperlink for short). A hyperlink is a link to a web page, in which the link includes an anchor and a reference to the uniform resource locator (URL) for the web page.

The basic units of the news story analysis system are a data collection unit 10, a trending unit 20 and a user interface unit 30. The data collection unit 10 is configured to collect social media data from social media platforms and content data from news story sources. The trending unit 20 is configured to calculate the social media impact of news stories. The user interface unit 30 is configured to communicate with users so they can interact with the trending unit and extract useful data therefrom, for example extract news information of interest based on user-configured filters in combination with story-based and entity-based rankings computed by the trending unit 20 as described herein. The user interface unit 30 can also allow user interaction with the data collection unit 10. It will be understood that the user interface can conveniently be web-based, but could be hosted inside by a proprietary network connected to the system via point-to-point communication lines.

A first group of elements in web space are news story sources 102*a*, 102*b* . . . 102*n* where content resides, labelled by, for example, as RSS (Rich Site Summary), Web Crawler and News Agency. Other example news story sources are Facebook public feed and FB Open Graph (Facebook Open Graph), Twitter streaming and Reddit. RSS sources can originate from conventional media news outlets or agencies such as BBC News, Sky News, NBC News, Fox News and Reuters or from corporations or public bodies, such as multi-national corporations and universities.

Figure 2:
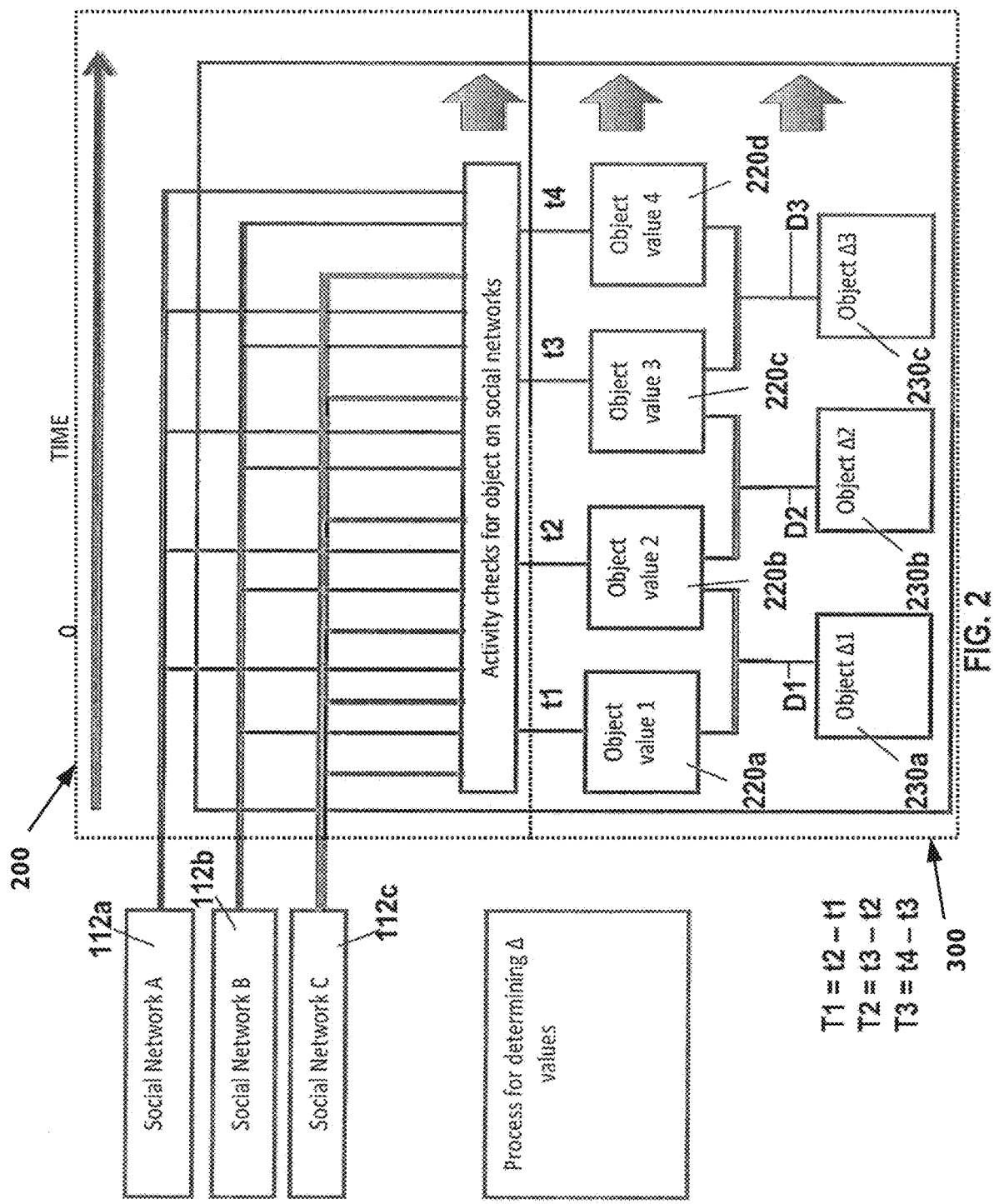
FIG. 2 is a flow diagram for a digital content object activity module and object scoring module.

Shown in FIG. 2, a second group of external elements in web space are social media platforms 112*a*, 112*b* . . . 112*n* on which users engage with the news stories that reside on the news story sources, labelled by way of example, as Facebook, Twitter and LinkedIn. It is noted that one or more of the social media platforms can also contain news stories, so can also constitute news story sources 112*n*, for example social media platforms that include blogging platforms, such as Medium, LinkedIn and Tumblr. A social media platform running on a network is configured to allow users to use software and application enabled interfaces to publish or distribute information to one another. Other common social media platforms that can supply raw data for collection, include but are not limited to, Pinterest, Tumblr, Instagram, Medium, and Reddit. Social media platforms also include internal social media platforms that may run solely on one organization's intranet system.

System 100 software is hosted by a computer that is connected to the world-wide web. The computer can be a server as, for example, described in more detail with respect to FIGS. 8-9. The system 100 is connected in operative communication with the news story sources 102*n* and social media platforms 112*n*.

The system 100 is configured to trawl the web for news stories, measure how much engagement they are attracting on one or more social media platforms, i.e. how trending they are, and from the trending data produce separate rankings for how trending the news stories are, and how trending are the named entities mentioned in those news stories. In other words, the outputs of the system 100 are a news story ranking and an entity ranking.

Figure 4:
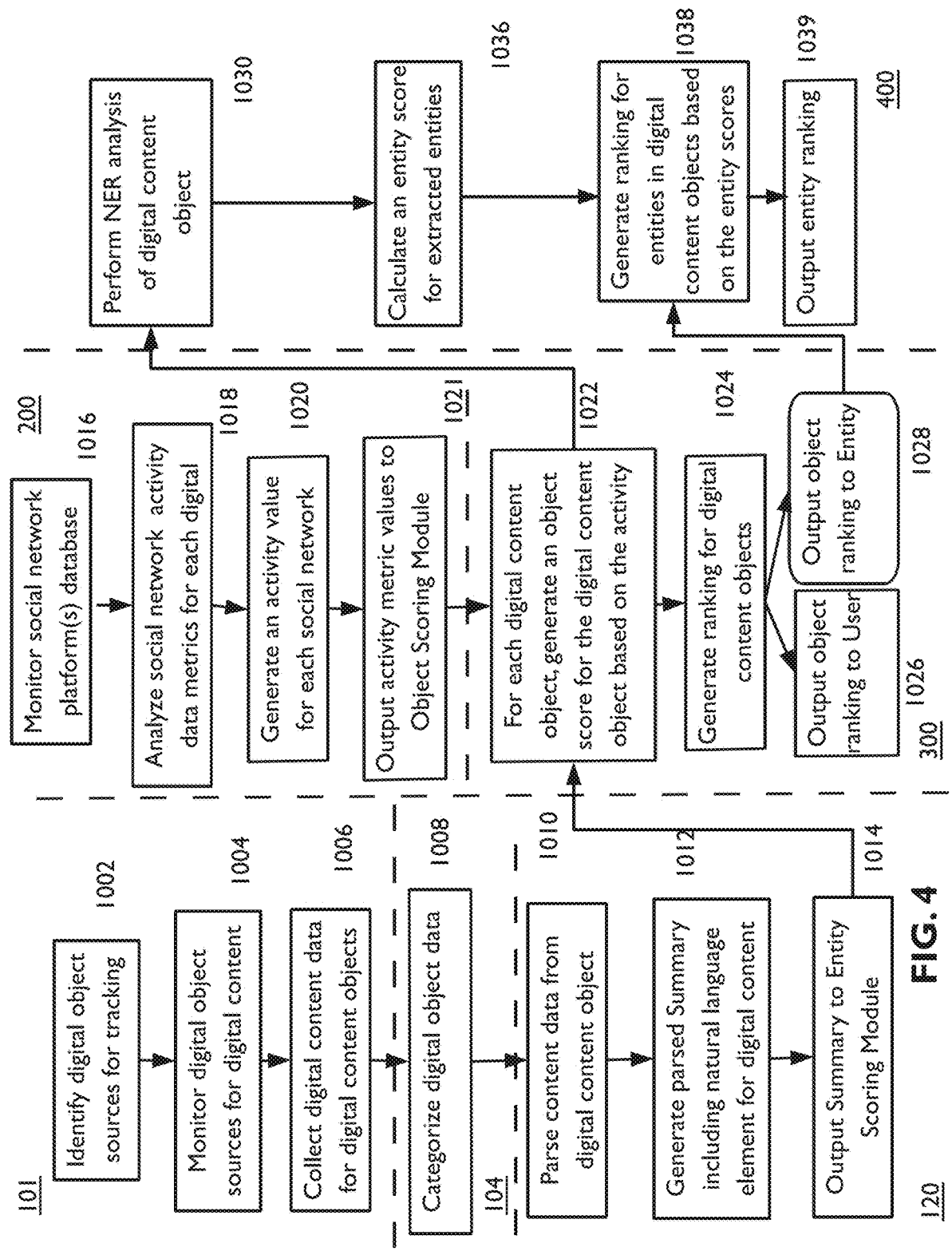
FIG. 4 is a high-level flow chart showing embodiments of system modules' operation.

Embodiments of the system 100 modules are now described in conjunction with FIG. 4. The same reference numbers are given for the same components throughout this disclosure.

In at least one embodiment, at block 1002, the tracking module 101 is configured to track and identify at least one digital object in one or more digital object sources 102*a*, 102*b* . . . 102*n*. The one or more digital object sources 102*a*, 102*b* . . . 102*n*, which generally can be some form of content producing digital platform as described above, such as a website, can be first identified, and can then be monitored by the system 100. The digital object sources 102*a*, 102*b* . . . 102*n* can be identified by an end user of the system 100, an administrator of the system 100, or an automated process in the system 100, such as a web crawler or a computer program that can browse the world wide web or pre-identified portions of the world wide web to detect and/or index content. For example, in at least one embodiment of the system 100, an administrator or end user of the system 100 can manually identify sources in one or more websites, can manually categorize the sources, and can use the categorized sources for the system 100. The source can be, for example, an RSS feed or a particular subsection of a website where a given category of content is published. These sources can be used to identify and categorize digital objects.

In at least one embodiment, at block 1004, after at least one digital object source 102*a*, 102*b* . . . 102*n* is found, the tracking module 101 is configured to monitor at least one digital object source 102*a*, 102*b* . . . 102*n* for new digital content objects. In at least one embodiment, the at least one digital object source is a news story source and the digital content objects are digitally published news stories. The monitoring process can employ a web crawler or other computer program to identify new digital content objects in or from the digital object source 102*a*, 102*b* . . . 102*n*, or can be configured to receive published announcements or syndication from the digital object source 102*a*, 102*b* . . . 102*n*. An automated process can be used by the news story tracking module to identify the news story sources, such as a web crawler that systematically browses the world-wide web. The web crawler can be part of the tracking module, or can be externally accessed as a news story source as shown by the label in box 102*n*. In an embodiment, a software product or service external to the system 100 can be used for the identification of new digital content objects. For example, in at least one embodiment of the system 100, the system 100 can monitor RSS feeds and crawl websites programmed into or pre-selected by an operator of the system 100. The digital object can comprise a news story, video, audio file, blog, event, topic, photograph, product website, product webpage, political website, political webpage, music, other media, or any digitally stored object embodied in some form on the Internet, a local network, or some other form of sharing digital data. A digital object can be identified by, for example, a URL, a hyperlink, or any other unique digital identifier for the digital object on the world-wide web. The tracking module 101 can be based on a computer, a server, or spread across an array of linked computers or servers.

Alternatively, the news story sources to be monitored can be pre-configured by a system administrator. A news story can be identified by, for example, an URL, a hyperlink, or any other unique digital identifier for the news story on the world-wide web. A news story source can be a website or a sub-section of a website, for example.

In at least one embodiment, at block 1006, the identified digital content objects are collected in a digital content object database 103 for processing.

In at least one embodiment, at block 1008, when the tracking module 101 identifies and collects one or more digital content objects, the categorization module 104 can categorize the digital content objects of the digital object sources 102a,102b . . . 102n. In at least one embodiment, the categorization module 104 is operatively connected to a tracking module 101 and parsing module 120. The categorization module 104 is configured to ascribe categories to news stories identified to it by the tracking module 101 shown in FIG. 1A. The data used for the categorization process can include, for example, information previously determined and inputted regarding at least one of the digital object sources 102a, 102b . . . 102n, information derived from the one or more digital object sources 102a,102b . . . 102n, information stored in the system 100, and information requested from an external source. The categorization module 104 can be pre-configured by a system administrator. For example, different news story sources can be tagged with categories such as: country of origin (US, UK, Ireland, China . . . ); language (English, Chinese, Japanese, German . . . ); subject matter (business, technology, sport . . . ). The categorization module 104 can categorize news stories using: metadata containing information that indicates that the object is of a certain type; forms of digital content associated with the news story (such as video, audio, image, or other file types); keywords associated with or contained in text content of the news story; categorization by a third party source, such as an external index that indicates that a news story is of a certain type, or that objects associated with a particular news story source are of a certain type; categorization by system users; categorization by system administrators; or categorization by social network users.

For example, in an embodiment the categorization module 104 can use data inputted by an administrator or end user of the system 100 in order to correctly categorize the digital content object. For example, categorization data can include categories based on editorial categories configured by an administrator. The administrator can input data to identify a digital object source 102a,102b . . . 102n as being located in the United Kingdom ("UK"), and producing or linking to content relating to technology and business. The categorization module 104 can automatically categorize any digital content object data from this source 102a,102b . . . 102n as UK, technology, and business. For example, in one or more embodiments, a machine learning classifier (e.g. an automated text classifier) can be configured to automatically categorize digital content object data from this source. Thus, data from digital content objects 105, shown in FIG. 1A, for one or more digital object sources 102a,102b . . . 102n can be collected in a database 103 and categorized. As will be appreciated other methods of categorizing digital content objects can be employed.

In at least one embodiment, at block 1010 the object parsing module 120, shown in FIG. 1A, is configured to gather data from a digital content object and parse the data. The data the parsing module 120 can extract from the digital object can include, for example, a picture, text, a video file, an audio file, metadata, or some other information. In at least one embodiment, at block 1012, the data from the digital content object is parsed so that a parsed summary representing the digital object can be provided. The parsed summary can be a parsed summary file 107, shown in FIG. 1A, representing the digital object.

In at least one embodiment, the parsing module 120 is configured to parse news stories and to obtain categorization for them. For example, when the digital object is a news story containing text and an image, the parsed summary file 107 or files can contain a headline from the news story; some keywords associated with the story; summary text relating to the story; a thumbnail picture or other rendering of the image associated with the story; the publication or web site or other digital platform where the story may be found; or feedback or reactions relating to the story from third parties, system users, or social network users.

In at least one embodiment, at block 1014, the parsing module is configured to create, store and make available for output a summary file 107, for example, of a news story, which includes a natural language element (typically in the form of text) on which entity recognition can be performed by an NER classifier as described herein. The summary file 107 may optionally also include some multimedia content such as a thumbnail image representative of the news story. The parsing can be category dependent, so the parsing module 120 is in operative communication with the categorization module 104 to obtain categorization data for the news stories which it is parsing and store this categorization data with the other parts of the parsed information relating to the news story. Exemplary parsing engines suitable for use in the present parsing module include those described in U.S. Pat. No. 8,234,263 B2 and the named entity extractor and natural language parser described in US Application 2015/0106078 A1, the entirety of each of which are incorporated by reference hereby.

Of course, data collection module 10 can be configured collect and to output summary files 107 as well as digital content object files 105 including, among other content, some or all of the natural language elements in the file to the tracking unit 20 for AI natural language processing and NER processing. In embodiments, these files 105, 107 can be processed stored and output for batch processing or streamed or otherwise provided an individual basis.

Referring to FIG. 4, an activity measurement module 200 is configured measure to social media activity and engagement metrics for a particular digital object. Social media activity and the associated metric(s) include measurable user-related activity or action in a social media platform. It will be understood that different social media platforms 112n can have a mixture of common and differing metrics depending on how each one is designed. Examples of social media activities that can be captured by an associated metric include, but are not limited to:

publishing a link to a news story on a social media platform (such as, "sharing" a story via Facebook or publishing the news story as a post on Twitter);

recommending a news story using tools available through the social media platform (such as, "liking" or "recommending" via Facebook);

using social media to comment on or discuss a news story provided or published by another user (such as, making a comment or otherwise interacting with a link shared by another user on Facebook);

posting or sharing a link to a news story in a social media platform (for example, publishing a link on Twitter or sharing a link on Facebook);

commenting on a link to a news story shared in a social media platform (such as a photo or other content published within the social media platform);

using a social media account to comment on or otherwise interact with or engage with a news story (such as using a Facebook or Twitter account to post a comment on a news article or blog post);

using a social media account to recommend, approve of, or otherwise promote a news story; using a social media platform to publish an opinion, reaction or comment relating to a news story;

using a social media platform to distribute or communicate a news story; interacting socially with a news story in a social media platform.

The activity measurement module 200 can measure any or all of these actions relating to a social network or to a particular social network account.

In at least one embodiment, at block 1016, the activity measurement module 200 is operative to communicate with the social media platforms 112a, 112b . . . 112n, for example, via a web service application programming interface provided by the social media platform. At block 1018, the activity measurement module 200 is configured to analyze social network activity data metrics for each digital content object. For example, the activity measurement module 200 measures the engagement in social media with a digital content object, for example a news story, using one or more metrics such as described above. In at least one embodiment, at block 1020, the activity measurement module 200 is configured to generate a value for each selected activity metric and at block 1021, output these social activity metric values to the object scoring module 300. Each such metric value serves to measure user engagement with the news story on social media, for example, how many shares, tweets and other engagements the news story is attracting in a given period of time. For Facebook, these engagements can mean a share, like or comment; for Twitter, a tweet or retweet of a link; and for LinkedIn, a share of the content. In at least one embodiment, the metric can be an aggregate engagement metric for different social media metrics, for example, a value that aggregates shares, comments, tweets, likes or other engagements and sends a single value for the aggregated engagements. For example, a social network platform such as Facebook may configure its system to send an aggregate value for engagements with a story rather than separate values for shares, likes, comments, and the like on the story, in which case the activity measurement module can measure engagements with the aggregate engagement metric value.

FIG. 2 describes at least one embodiment of the activity measurement module 200 in operative communication with an object scoring module 300. In this embodiment, the activity measurement module 200 can include code that can be executed by a processor and that can be used to generate an activity metric value for social network activity of a digital content object. The activity measurement module 200 can be communicatively coupled to one or more social network databases 112a, 112b, and 112c. The system 100 can communicate with the social network databases 112a, 112b, and 112c via a web service application programming interface provided by the social network. For example, the system 100 can communicate with the social graph data provided by Facebook. The activity measurement module 200 can use this information from the social network databases 112a, 112b, and 112c to determine an activity metric value. In at least one embodiment, activity measurement is triggered by receipt of an external request from another module. Activity measurement is implemented by the activity measurement module 200 by formulating and sending a query to a social media platform 112n. On receipt of a reply to the query, it assigns a value to each metric based on the reply, and these values are then sent to the requesting module as a reply to the original external request.

In at least one embodiment, at block 1022, an object scoring module 300 is configured to generate an object score for each digital content object based on the activity metric values for the digital object. For example, in FIG. 1A the object scoring module 300 is a story scoring module 300 configured to score each monitored digital news story object for its social media impact on social media platforms, such as Facebook, Twitter, and LinkedIn. In at least one embodiment, at block 1024, the scores are then compared to generate and output a story ranking list. The story scores are based on a value of one or more social media activity metrics. The story score shows to what extent the news story has attracted social engagement, over any given period of time, which can be very current and short term, or over the medium term, long term or historically.

In at least one embodiment, the story scoring module 300 is in operative communication with the parsing module 120. At block 1022, the object scoring module is configured to generate an object score for each digital content object based on the activity value metrics for the digital content object. For example, using the output from the parsing module 120 at block 1014 and the output from the activity measuring module 200, the object scoring module compiles a list of news stories to be compared, which can be category dependent.

For each news story that is in the batch of news stories to be compared, the story scoring module 300 requests values of activity metrics of specified social media platforms from the activity measurement module 200. The social media platforms identified in the request can be category-specific, e.g. if the subject matter category is "business" then the request can specify LinkedIn as the, or one of the, social media platforms. A single request can be sent to the activity metric measurement module 200 for all news stories in the batch, or individual requests, one for each news story object. On receipt of the activity metric values, the story scoring module then determines a story score for each news story, in which the story score is based on the values of the social media activity metrics associated with that news story which it receives from the activity metric measurement module. In an embodiment, the story score can be determined by applying one or more pre-defined formulas that will give different weightings to different factors, in which the weightings can emphasize or de-emphasize factors such as:

The social media platform
   (e.g. more weight to LinkedIn for stories with a business category)
   (e.g. more weight to Twitter for celebrity stories)
   (e.g. more weight to Facebook for local community stories)

The geographic origin of the news story source
   (e.g. more weight is given to a specific country)

Time of publication
   (e.g. recent stories given more weight)

Different weightings per social media activity on a single social media platform
(e.g. different weightings for shares, likes, and comments in Facebook)
(e.g. different weightings for tweets and re-tweets in Twitter)

Statistical normalization can be used to achieve a weighting between the different values that contribute to the overall score.

In at least one embodiment, the object score 220 is based on a single sample of the relevant social media activity metrics. In other words, the object score 220 is based on the activity values from the activity measurement module 200 as described above, e.g. numbers of tweets and retweets, over a given period of time, e.g. the last 36 hours.

For example, in one embodiment of the system 100, the object score 220 for a digital content object can be based on an "OverAllScore" that is determined as shown below:

OverAllScore=(FaceBookCommentsScore*0.18)+
(FaceBookSharesScore*0.37)+(FaceBook-
LikesScore*0.11)+(LinkedInSharesScore*0.33)+
(TweetCountScore*0.01).

As shown above, some social networks can be weighted more than others, and some interactions can be weighted more than others. For example, the posting of a link on Facebook can be weighted ten times more than another type of social network interaction, the mentioning of a link in a Tweet can be weighted five times more than another form of social network interaction, a Facebook "like" or recommendation can be weighted four times more than another form of interaction, the sharing of a link on LinkedIn can be weighted fifteen times more than another form of interaction, a Facebook comment can be weighted two times more than another form of interaction, and the like.

In at least one embodiment, the system 100 can repeatedly measure the object score values over time, thus determining multiple values for object scores 220a, 220b, 220c, and 220d. The time period between each measurement can vary. These time periods can be set by a system administrator or can result from the length of time associated with the processes of system 100. In some instances, the time period can be as short as can be achieved using the amount of computing power contained in the system 100. A time period can be very short (seconds) or longer (hours). The time period can extend to days or lengthier periods for some digital object types or sources. The time period assigned to some objects can differ depending on the level of activity associated with the objects. Objects associated with higher levels of social network activity can be checked more frequently, possibly resulting in shorter periods of measurement.

In an embodiment, the time period can also be measured and tracked by the system 100. For each digital object, the system 100 can then determine the change in social network activity since the previous time the system 100 obtained activity values and calculated object score values 220a, 220b, 220c, and 220d from social network activity, and the length of time that has elapsed between each measurement. This information can be stored in a digital database or databases 103, linking each digital object with its associated categories, associated parsed information (such as text, images, and other information), measurements of social network activity relating to the objects, the timing of these measurements, the differences in time between these measurements, object score values derived from these measurements, and comparisons of changes in the score values of the object scores derived from these measurements.

For example, the object score can also be based on object delta values, e.g., on a comparison of two samples of the relevant social media activity taken over two or more periods of time, e.g. the last 24 hours and the 24 hours prior to that last 24 hours. The object score then looks at changes in each of the metrics between these two time periods.

Figure 3:
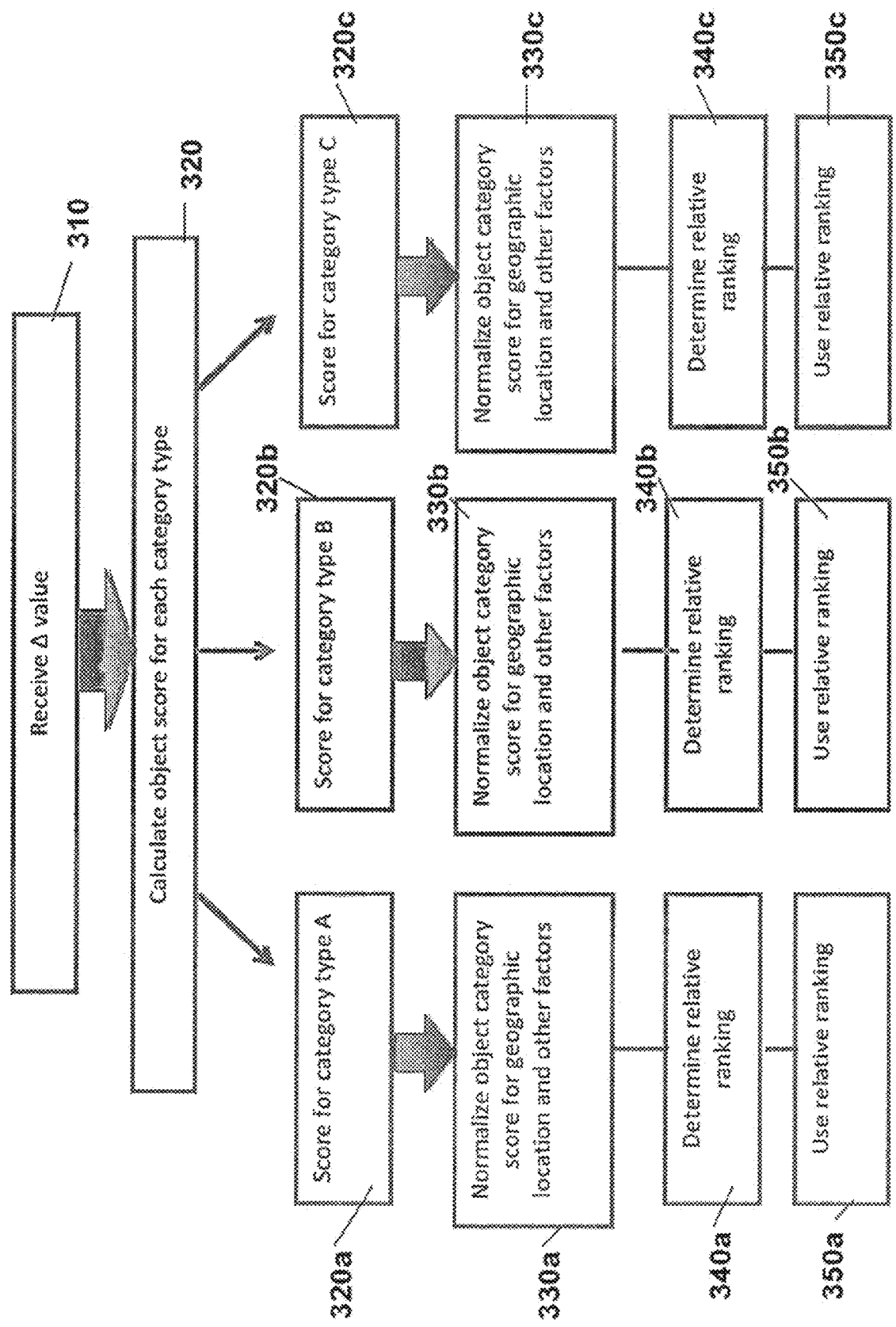
FIG. 3 is a flow chart showing a process of using object Δ values in social network activity to rank objects in accordance with an embodiment.

For example, as shown in FIG. 3, the system 100 can check the change in social network activity over time for a given digital object. The change in activity can be calculated by determining the level of activity at sequential points in time, such as, t1, t2, t3, and t4. A recording of an object score value can occur between a difference in time or a time period T. The difference in time or the time period T can be calculated based on:

$$T1 = t2 - t1$$

$$T2 = t3 - t2$$

$$T3 = t4 - t3$$

The levels of activity at each time, t1, t2, t3 and t4 can be recorded as object score values, 220a, 220b, 220c, and 220d. For example, at time t1, an object score value 220a can be recorded; at time t2, an object score value 220b can be recorded; at time t3, an object value 220c score can be recorded; and at time t4, an object score value 220d can be recorded. A difference D between each object score value, such as 220a, 220b, 220c, and 220d, can represent the total change in social network activity. The difference D can be calculated based on:

$$D1 = \text{object value } 220b \text{ at time } t2 - \text{object value } 220a \text{ at time } t1$$

$$D2 = \text{object value } 220c \text{ at time } t3 - \text{object value } 200b \text{ at time } t2$$

$$D3 = \text{object value } 220d \text{ at time } t4 - \text{object value } 220c \text{ at time } t3$$

Using these object score values, an object Δ value, such as 230a, 230b, and 230c, representing the change of activity associated with the digital object, can be derived based on:

Object Δ1 230a = D1/T1

Object Δ2 230b = D1/T2

Object Δ3 230c = D3/T3

Where: T1, T2, T3=variable time periods
D1, D2, D3=differences in social network activity over each variable time period T1, T2, T3, respectively The object Δ value, such as 230a, 230b, and 230c, can change each time the system 100 gathers new object score values including new social network activity measurement values for an object. Hence, the speed of "spread" (or additional social network activity) of the object can be periodically derived and recorded in the system 100. The object score value data based on object score values 220a, 220b, 220c can be either weighted using variables, normalized in relation to other data, or otherwise subjected to changes before the difference D between each measurement is calculated. Similarly, the difference D between each measurement can be either weighted using variables, normalized in relation to other data, or otherwise subjected to changes before the change of activity based on object Δ values 230a, 230b, 230c is derived.

In at least one embodiment, at block 1024, the scoring module 300 can also generate a digital content object ranking. For example, in at least one embodiment, the digital content objects can be ranked using the object Δ values, such as 230*a*, 230*b*, and 230*c*, over time generated by measuring the change in social network activity and other data. FIG. 3 shows a process of using object Δ values in social network activity to rank objects in accordance with an embodiment. The ranking can be generated at intervals T, or at other intervals that depend on the amount of resources available to the tracking module 101, the activity measurement module 200, scoring module 300 or other modules in the system 100. In one construction of the scoring module 300, the ranking can be dynamically refreshed in a category as new Δ values are gathered for each digital object in the category, and for new digital objects within the category. The Δ value for each object can be combined with other variables to provide an object score 320 for the object. The other variables can include a total time passed since the discovery of the object by the system 100, a time at which measurement of the social activities took place, a time at which the object was created, and other variables. The variables can be adjusted to give greater prominence or higher scores to more recently created or discovered objects. The object score for an object can also be adjusted for the object in each category type assigned to it by the categorization module 104. For example, in category type A, the object can be given an object score 320*a*; in category type B the object can be given an object score 320*b*; and in category type C the object can be given an object score 320*c*. The scores 320*a*, 320*b*, and 320*c* can be stored with the rank of each category type A, B, and C.

Additional information can then be added to these category object scores 320*a*, 320*b*, and 320*c* to provide additional weight to the score associated with certain digital objects in relation to the score associated with other digital objects, depending on the objects' type, geographic source, time of publication, or other data. Among others, a process of statistical normalization 330 can be used to achieve a weighting between object scores. This allows the system 100 to allocate additional weight to digital content objects from sources 102*a* or 102*b* that are geographically closer or are otherwise of interest to the end user of the system 100. Thus, for example, for end users of the system 100 in the UK accessing online news stories, social network activity associated with those news stories that are produced in the UK or relate to the UK can be given a higher weighting. For example, in one construction of the system 100, for an end user in Ireland, a story from the UK can be given a lower weighting than a story from Ireland. The process of statistical normalization of scores from sets of data with differing distributions is familiar to programmers of ordinary skill in the art.

Alternatively, the object score 320 can be determined for each object using data from multiple measurements of social network activity values. In one embodiment, such multiple values can be used to degrade the score for a digital object over time.

Score=220*a*(p)+220*b*(q)+220*c*(r)+ . . . 220*n*(s)

T1+T2+T3+ . . . Tn

Where:
Score=The score used for ranking a given digital object.
220*a*=Social network activity at time t1
220*b*=Social network activity at time t2
220*c*=Social network activity at time t3
220*n*=Social network activity at time to
s, r, q and p are numbers where s>r>q>p
T1=t2−t1, T2=t3−t2, T3=t4−t3, Tn=t(n+1)−tn In at least one embodiment, a normalized object category score 330*a*, 330*b*, and 330*c* can be applied to each digital object for each category A, B, and C, respectively. Using the normalized object category score 330*a*, 330*b*, and 330*c*, the objects can be ranked according to their relative weighted scores to determine a relative ranking 340*a*, 340*b*, and 340*c*. The relative ranking 340*a*, 340*b*, and 340*c* can then be used to provide a relative ranking 350*a*, 350*b*, and 350*c*. The relative ranking 350*a*, 350*b*, and 350*c* can then be used to generate a table, display, or other information to convey the rank of one or more digital content objects. The same object can earn different relative scores in each subject category, represented by the numerals 340*a*, 340*b*, and 340*c*, resulting in variable rankings, 350*a*, 350*b*, and 350*c*.

An example of digital content object scoring scheme that can be employed with embodiments as described herein is further described in U.S. Pat. No. 9,342,802 entitled System and Method of Tracking Rate of Change of Social Network Activity Associated with a Digital Object, the entirety of which is incorporated by reference herein. A further option would be to base the story score on rate of change of the social media activity metric over at least three defined periods of time. Still more sophisticated story scoring can be based on curve fitting and extrapolation to activity versus time graphs created by plotting a social media activity metric over time, for example, by frequent sampling of social media activity over many recent time periods to obtain the data points.

In at least one embodiment, at block 1026, the object scoring module 300, shown in FIG. 1A, is configured to output a digital content object ranking to the user interface. In another embodiment, at block 1028, the object scoring module 300 can also be configured to output the digital content object ranking to the entity ranking module.

For example, in at least one embodiment, the entity scoring module 400 is in operative communication with the object (story) scoring module 300, from which the entity scoring module 400 receives as input the list of news stories including story scores to be analyzed for named entities. In an embodiment, the object (story) scoring module 300 can also provide the entity scoring module 400 with the story ranking list. The entity scoring module 400 is also in operative communication with the parsing module 120 from which it receives the digital content object file 105 and/or the summary file 107 or both containing the natural language element for each of the news stories to be analyzed by the NER classifier. For purposes of illustration, the embodiment of the entity scoring module 400 is shown and described as performing NER analysis on only summary files 107, however the system 100 can perform AI natural language processing including NER analysis on each of the full content of the digital content objects, parsed or partial text elements for each of the digital content objects, or both.

For purposes of illustration and ease of understanding, in FIG. 1A and FIG. 4, the entity scoring module 400 is shown and described as including the NER classifier 410 and performing NER extraction. In an embodiment, the NER classifier can be included in the data collection module 10, for example in the parsing module 120. For example, as shown in the exemplary non-limiting logical configuration illustrated in FIG. 1B, the parsing module includes the NER classifier and can be configured to process and include NER entity extraction and classification and output summary files 107, digital content object files 105, as well as a database 401 including the AI natural language and NER processed and extracted entity data 403 as described herein. The entity scoring module 400 is also in operative communication with the parsing module 120 from which it receives the digital content object file 105 and/or the summary file 107, or both, as well as the NER processed and extracted entity data 403. As will also be appreciated, in embodiments databases 103, 401 and data therein, though shown in particular modules, can be shared and accessed across components and modules of the system 100 and need not be located in specific components for access to the data for, among other things, story scoring and entity ranking as described herein. For example, databases 103, 401 can be accessed by the data collection module 10 and its component modules and the trending unit 20 and its component modules. The logical architecture and operational flows disclosed herein are illustrated to describe embodiments in an exemplary manner without limitations to a specific architecture, as skilled artisans may modify architecture design when, for instance, implementing the teachings of the present disclosure into their own systems.

Returning to FIG. 1A, the entity scoring module 400 is configured to extract named entities that appear in the batch of tracked news stories and then calculate a change measured between a previous and a current time frame. The change calculation is based on the engagement that news stories which mention each named entity are attracting on social media. In turn, the entity scores are then sorted to provide an entity ranking list suitable for output. All entities are extracted from a new story, e.g. from its summary 107, and the extracted entity data 403 is stored for later use in a database 401 so that filters and analysis can be applied to the extracted and stored entity data 403. In at least one embodiment, the system is configured store the extracted entities in a search engine database. An exemplary search engine is ElasticSearch from Elastic Search BV, Amsterdam, although as will be appreciated, other search engines or searchable databases 401 can be employed.

The entity scoring module 400 is configured to perform an NER analysis on natural language elements of content in digital content object and data derived therefrom. In at least one embodiment, at block 1030, the entity scoring module 400 includes an NER classifier 410 configured to perform NER analysis: extract those named entities that appear in each digital content object's natural language element. For example, the entity scoring module 400 includes an NER classifier 410 configured to perform NER analysis of digital content object summary file 107. As will be appreciated, the entity scoring module 400 can be configured to perform an NER analysis on some or all of the natural language elements of a digital content object, for example, a summary file 107 of a news story and the body or main content of a news story file 105. In another embodiment, the entity scoring module 400 can be configured to extracting named entities only from a summary file 107 of a digital content object, for example, the summary file 107 of a news story or abstract of a technical paper. One exemplary advantage of this configuration is that NER analysis of news summaries and abstract typically include the central entities mentioned in the story, providing that the summary and abstract gives an accurate reflection of the story.

In at least one embodiment, the entity scoring module 400 can use a NER code classifier such as the publicly available MITIE (MIT Information Extraction) library (https://github.com/mit-nlp/MITIE). The MITIE library NER classifier comprises a model that is available in pre-trained form, e.g. pre-trained in English. The English NER model has been trained based on data from:

the English Gigaword news corpus;
    the CoNLL (Conference on Computational Natural Language Learning)—2003 named entity recognition task; and
    ACE (Automatic Content Extraction) data from NIST (National Institute of Standards and Technology).

As will be appreciated, any library code that supports NER can be used for embodiments including an NER classifier. For example, NER code available from ClearForest Corp. of Waltham, Mass., StanfordCoreNLP <http://nlp.stanford.edu/software/CRF-NER.shtml>; and Natural Language Toolkit (NLTK) <http://www.nltk.org/>.

At block 1036, the entity scoring module 400 is also programmed to calculate an entity score that represents a change measured between a previous and a current time frame. The change calculation is based on the story scores of those digital content objects in which that named entity appears. At block 1038, the entity scoring module 400 is configured to and sort the entity scores to generate an entity ranking list based on the entity scores. At block 1039, the system is configured output the entity ranking, for example, to a user interface.

Figure 5A:
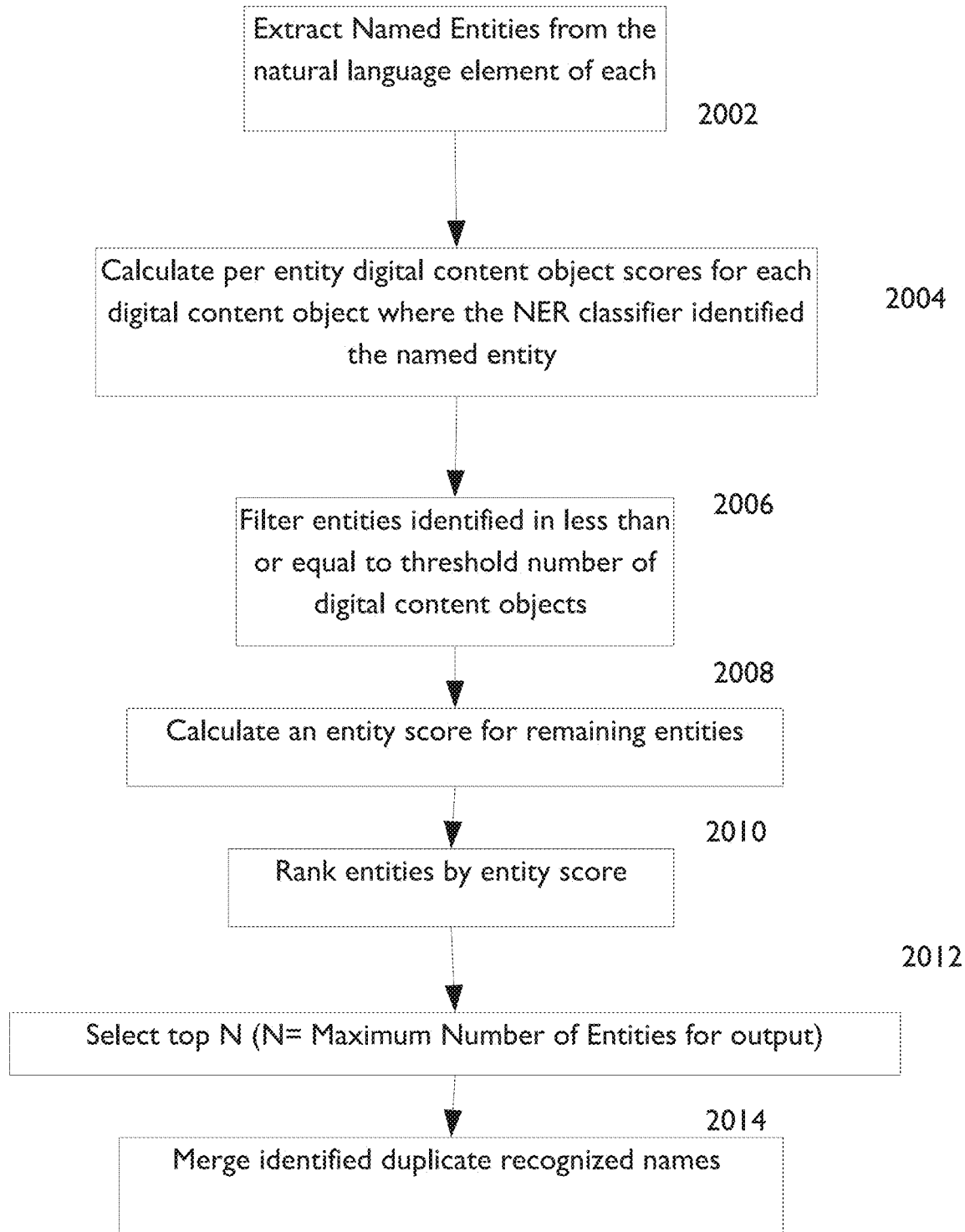
FIGS. 5A and 5B are flow charts illustrating embodiments of an entity scoring algorithm for the entity scoring module.
Figure 5B:
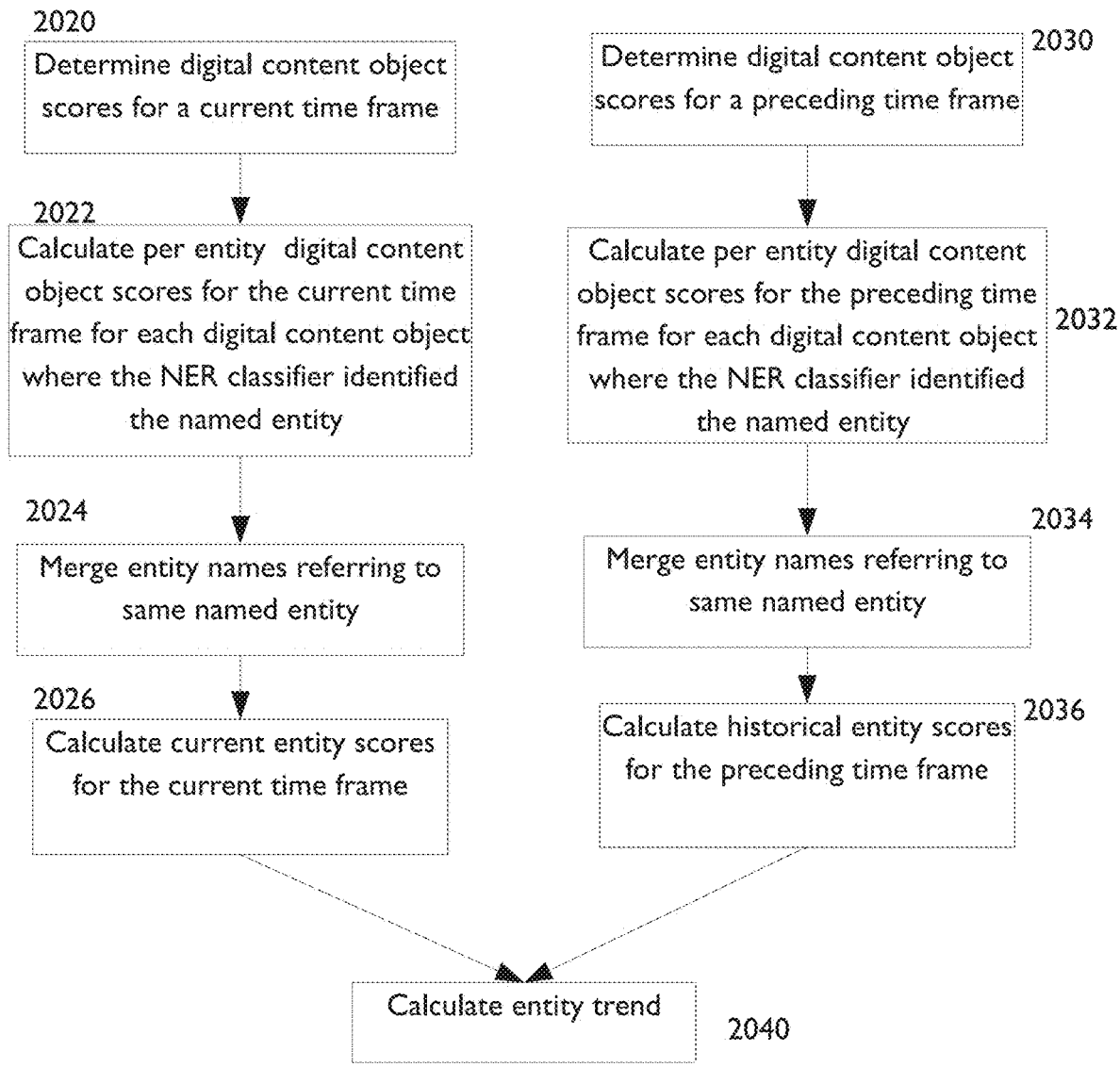

FIGS. 5A and 5B are flow charts illustrating an embodiments of an entity scoring algorithm for the entity scoring module 400. At block 2002, the entity scoring module 400 is configured to extract named entities from the natural language element of each digital content object, for example, from the summary file 107.

At block 2004, the entity scoring module 400 calculates on a per entity basis an entity score that aggregates the object scores of those digital content objects in which that named entity appears. In an embodiment, the entity scoring module 400 calculates an average of digital content object scores for each digital content object where the named entity is identified. The averaging of the story scores for each story where the entity is identified can be the mean, mode or median, or a more complex averaging method In another embodiment, described in more detail below with respect to FIG. 5B, the entity scoring module 400 can calculate entity scores for current and preceding time frames as well as entity trend scores.

At block 2006, the entity scoring module 400 applies a filter to exclude entities that are not identified in a threshold number of digital content objects. For example, the exclusion filter can exclude any named entities that are mentioned in only one news story. Excluding named entities from the entity ranking that only appear in one news story can be generalized to discarding named entities that appear in no more than a threshold number of news stories. The threshold can be one, as in the above example, or a higher number such as 2, 3, 4 or 5. The threshold can also be determined interactively based on a bar chart or other statistical distribution of the named entities mentioned in the batch of news stories, e.g. to set the threshold in order to discard a proportion of named entities, such as the lower quartile or those that lie outside one or two standard deviations from a Gaussian fit on the low side of the Gaussian. This filter takes into account only those entities that are mentioned in more than a threshold number of news stories, e.g. more than one in the example above, excludes named entities that are marginal and lowers the probability of presenting named entities in the entity ranking list that are, in fact, of little interest. In an embodiment, for the remaining entities, entity scoring module 400 further applies a filter to reduce the number of entities to a fixed sample size, for example 50 entities per entity type such as LOCATION, PERSON or ORGANIZATION. The sample size can also have a value higher or lower than 50. Limiting the number of entities to process reduces processing costs and eliminates potentially irrelevant entities. To select the most relevant sample of entities, the entity scoring module 400 selects the top 50 entities per entity type, ranked by the sum of object scores of all digital content objects that mention the respective entity. This ranking ensures that only entities that are of some interest are considered in the remaining processing steps.

At block 2008, the entity scoring module 400 is then configured to assign an entity score to each resulting named entity not excluded by the filter.

At block 2010, the entity scoring module 400 is configured to rank all resulting entities by their assigned entity scores, for example in descending order. At block 2012, the entity scoring module 400 selects the top N, N being a predefined constant that determines the maximum number of entities that will be presented as part of the output to the user interface 30. The maximum number of entities can be any number, for example from 1 to 1000. The maximum number can be preconfigured, can be input by a user, or can be provided to the user to select in predetermined increments, for example 1, 2, 3, 4, 5, 6, 7, 8, 9, 10, 11, 12, 13, 14, 15, 16, 17, 18, 19, 20, 30, 40, 50, 100, 200, 300, 400, 500 or 1000.

As will be appreciated, filters can be applied to the entity ranking after entity ranking, for example filtering results in accord with a filter parameter (e.g., LOCATION, PERSON, ORGANIZATION), for example provided on a user interface as described herein.

At block 2014, the entity scoring module 400 is configured to merge duplicates of names representing the same entity, e.g. different spellings, short form versus long form. The respective scores of the individual entities that are merged are summed up and the most frequent name, for example based on document count in Elasticsearch, is selected as the representative name and all other names are kept as versions related to the representative name. In an embodiment, entities may only be merged if they are of the same type, like Person, Location, and the like.

EXAMPLE 1

TABLE 1

| Story summary (natural language element) | Extracted named entities - persons and organizations | Story Score |
|---|---|---|
| 1. "Reigning WBO world welterweight champion Timothy Bradley is not shutting his door for a possible third bout with Manny Pacquiao, but he also won't mind seeing Terence Crawford get the fight instead." | "WBO", "Timothy Bradley", "Manny Pacquiao", "Terence Crawford" | 190 |
| 2. "Boxing promoter Bob Arum is keenly waiting for Manny Pacquiao to make his final decision regarding his choice of foe for his supposed farewell fight on April 9." | "Bob Arum", "Manny Pacquiao" | 117 |
| 3. "American Timothy Bradley says he will rely on a "way different" strategy built on a highly detailed game plan when he defends his WBO." | "Timothy Bradley", "WBO" | 165 |
| 4. "Former world boxing champion Manny Pacquiao said on Monday TV coverage of his WBO welterweight bout with American Timothy Bradley would not violate Philippine election laws or give him an undue advantage in his bid for a seat on the Senate." | "Manny Pacquiao", "WBO", "Timothy Bradley", "Senate" | 72 |

TABLE 1-continued

| Story summary (natural language element) | Extracted named entities - persons and organizations | Story Score |
|---|---|---|
| 5. "Bob Arum may not share Manny Pacquiao's opinion on same-sex marriage, but the Top Rank chief executive said he will defend "to the death" the Filipino boxer's right to express his beliefs." | "Bob Arum" "Manny Pacquiao" "Rank" | 479 |

TABLE 2

Ranking of named entities:

| Rank | Named Entity | Entity Score | Comment |
|---|---|---|---|
| 1. | "Bob Arum" | (117 + 479)/2 = 298 | mentioned in two stories, one of which is currently strongly trending |
| 2. | "Manny Pacquiao" | (190 + 117 + 72 + 479)/4 = 214 | mentioned in several stories, one of which is currently strongly trending |
| 3. | "WBO" | (190 + 165 + 72)/3 = 142 | mentioned in several stories, none of which is currently trending |
| 4. | "Timothy Bradley" | (190 + 105 + 72)/3 = 142 | mentioned in several stories, none of which is currently trending |

Tables 1 and 2 show how the averaging of the story scores per entity, results in lower ranking for entities that are mentioned in stories with lower story scores (i.e. representing stories that are currently not trending strongly online) and gives higher ranking for entities that are mentioned in stories with higher story scores (i.e. representing stories that are currently trending strongly online). For example, the named entity "Manny Pacquiao" is mentioned in 4 of 5 story Summaries (1, 2, 4 and 5), however has a Named Entity rank of 2, whereas "Bob Arum" has the top rank of Named Entity 1 despite being named in only 2 of the 5 stories (2 and 5). Summary 5, which includes both "Manny Pacquiao" and "Bob Arum", has a story score of 479. Because Manny Pacquiao is mentioned three stories with low story scores, whereas Bob Arum is only in one low scoring, non-trending story, Bob Arum is ranked number 1.

The entity scoring module 400 can then output the entity ranking list to a user interface unit 30. In an embodiment, the entity ranking list is output as a JSON (JavaScript Object Notation) response, a widely used language-independent data format. A specific example output is as follows:

```
{u'_shards': {u'failed': 0, u'successful': 5, u'total': 5},
u'aggregations': {u'agg_entities_with_social_vel_above_x':
{u'doc_count': 11,
u'entities': {u'doc_count': 40,
  u'filter_by_entityType': {u'doc_count': 22,
  u'top_entities':  {u'buckets': [{u'avg_articleScore_per_entity':
    {u'avg_entityScore':
    {u'value': 614.0305746715786},
    u'doc_count': 3},
  u'doc_count': 4,
  u'key': u'Reeva Steenkamp'},
  {u'avg_articleScore_per_entity': {u'avg_entityScore':
    {u'value': 370.57768691713426}, u'doc_count': 5},
  u'doc_count': 5,
  u'key': u'Oscar Pistorius'}],
    u'doc_count_error_upper_bound': 0,
    u'sum_other_doc_count': 0}}}}},
```

-continued

```
u'hits': {u'hits':[], u'max_score': 0.0, u'total': 42291},
u'timed_out': False,
u'took': 3}
```

EXAMPLE 2

In an embodiment, the entity scoring module can calculate entity scores for a predetermined time frame. For example, as shown in FIG. 5B, the entity scoring module can calculate entity scores for a current time frame. At block 2020, the system 100 identifies and determines digital content object scores and extracts named entities for digital content objects in current time frame. At block 2022, the entity scoring module 400 calculates on a per entity basis a score that is a sum of the object scores of those digital content objects in the current time frame in which named entity appears. In embodiments, at block 2026, the entity scoring module 400 can be configured to merge entity names referring to the same entity, for example, by using fuzzy string matching, then and sum the scores of all merged entities. Then, at block 2026, the entity scoring module 400 calculates current entity scores for the current time period. In an embodiment, the entity scoring module 400 normalizes all entity scores by dividing each entity score with the total sum of entity scores in the current time frame.

As shown in FIG. 5B, the entity scoring module can calculate entity scores predetermined time periods—for example current and preceding time frames—as well as entity trend scores. For example, by using the same approach as for current time frame, the entity scoring module 400 can, in parallel, calculate on a per entity basis a score for the entities that appear in those digital content objects within a previous time frame. At block 2030, the system 100 identifies and determines digital content object scores and extracts named entities for digital content objects in a preceding time frame. At block 2032, the entity scoring module 400 calculates on a per entity basis a score that is a sum of the object scores of those digital content objects in the preceding time frame in which named entity appears. In embodiments, at block 2036, the entity scoring module 400 can be configured to merge entity names referring to the same entity, for example by using fuzzy string matching, then and sum the scores of all merged entities. Then, at block 2036, the entity scoring module 400 calculates historical entity scores for the preceding time period. In an embodiment, the entity scoring module 400 normalizes all entity scores by dividing each entity score with the total sum of entity scores in the preceding time frame.

At block 2040, for each entity it calculates entity trend score as a change between previous and current time frame, for example by dividing the normalized current entity score of the current time frame with the normalized historical entity score of the previous time frame. The calculation of change can be selected from the group of: ratio, difference and percentage increase, or more complex methods for calculating a value change. If for an entity, the normalized historical entity score is not available for a previous time frame, for example, because it is a newly emerging name, a default minimum score can be assumed for the historical previous time frame. In an embodiment, the trend entity scores can be sorted to provide the entity ranking list.

Described is an example of processing a plurality of digital content objects for an embodiment, shown as a batch of 5 news stories for the current time frame (e.g. the last 24 hours), as well as a batch of 5 news stories for the time frame directly preceding the current one (e.g. the preceding 24 hours). It will of course be understood that much larger batch sizes are typically processed, however the illustration is sufficient to demonstrate system operation. It will also be understood that the framing of time frames can include any defined time period. For example, a current time frame can be 30 minutes, 1 hour, 3 hours, 12 hours, 24 hours, 3 days, 1 week and 1 month. A preceding time frame is a time frame in which articles are published between time point in the past before a current time frame and ending where current the time frame begins. For example, a preceding time frame can be 24 hours, 48 hours, 72 hours and 1 month.

TABLE 3

Stories and named entities in current time frame

| | Story summary (natural language element) | Extracted named entities - persons and organizations | Story Score |
|---|---|---|---|
| 1. | "James Comey testifies that Donald Trump lied in describing the reasons he was fired." | "James Comey", "Donald Trump" | 120 |
| 2. | "James Comey will testify before the Senate Intelligence Committee on Thursday." | "Senate Intelligence Committee", "James Comey" | 140 |
| 3. | "The Senate Intelligence Committee released on Wednesday remarks prepared by former FBI Director James Comey for delivery the next day." | "Senate Intelligence Committee", "FBI", "James Comey" | 220 |
| 4 | "House Speaker Paul Ryan said it's "obviously" inappropriate for President Donald Trump to have asked ousted FBI Director James Comey to pledge his loyalty." | "Paul Ryan", "Donald Trump", "FBI", "James Comey" | 183 |
| 5 | "James Comey testified Thursday that the FBI expected Jeff Sessions to recuse himself from the Russia investigation." | "Russia", "Jeff Sessions", "FBI", "James Comey" | 54 |
| | Σ | | 717 |

TABLE 4

Stories and named entities in preceding (historical) time frame

| | Story summary (natural language element) | Extracted named entities - persons and organizations | Story Score |
|---|---|---|---|
| 1. | "London Mayor Sadiq Khan is calling on the British government to cancel a state visit from President Donald Trump after Trump criticized his response to this weekend's terror attacks in London." | "London", "Sadiq Khan", "Donald Trump" | 250 |
| 2. | "Documents reveal the role of an FBI informant on the night nonviolent protesters at Standing Rock were sprayed with water and rubber bullets." | "FBI", "Standing Rock" | 138 |
| 3. | "CBS has announced that they will be airing James Comey's testimony before the Senate Intelligence Committee live on broadcast television" | "CBS", "James Comey", "Senate Intelligence Committee" | 150 |
| 4. | "President Donald Trump's approval rating is at 34%, a new Quinnipiac poll released Wednesday finds" | "Donald Trump", "Quinnipiac" | 75 |

TABLE 4-continued

Stories and named entities in preceding (historical) time frame

| Story summary (natural language element) | Extracted named entities - persons and organizations | Story Score |
|---|---|---|
| 5. "The White House is reportedly struggling to recruit strong candidates who want to serve as President Donald Trump's FBI directer." | "White House", "FBI", "Donald Trump" | 186 |
| | Σ | 799 |

TABLE 5

Scoring of named entities:

| Named Entity | Entity Score (now) | Entity Score (history) |
|---|---|---|
| "James Comey" | (120 + 140 + 220 + 183 + 54)/717 = 1.0 | 150/799 = 0.1877 |
| "Donald Trump" | (120 + 183)/717 = 0.4226 | (250 + 75 + 186)/799 = 0.639 |
| "FBI" | (220 + 183 + 54)/717 = 0.637 | (138 + 186)/799 = 0.4055 |
| "Senate Intelligence Committee" | (140 + 220)/717 = 0.502 | 150/799 = 0.1877 |

TABLE 6

Ranking of named entities:

| Rank | Named Entity | Entity Score (Trend) | Comment |
|---|---|---|---|
| 1. | "James Comey" | 1.0/0.1877 = 5.327 | Mentioned in several trending stories now, compared to only one story before. |
| 2 | "Senate Intelligence Committee" | 0.502/0.1877 = 2.6744 | Mentioned in two trending stories now, compared to only one story before. |
| 3. | "FBI" | 0.637/0.4055 = 1.571 | Mentioned in two trending stories and one smaller story now and two stories before. |
| 4. | "Donald Trump" | 0.4226/0.639 = 0.6613 | Mentioned in two stories now, compared to three stories before. |

Tables 3 and 4 show the story scores per entity for the current time frame and the preceding time frame, respectively. Table 5 shows the aggregation of the story scores per entity for each timeframe, resulting in lower scores for entities that are mentioned in fewer stories or in stories with lower story scores (i.e. representing stories that are currently not trending strongly online) and giving higher scores for entities that are mentioned in multiple stories with higher story scores (i.e. representing stories that are currently trending strongly online). For example, the named entity "James Comey" is mentioned in all 5 story summaries with relatively high story scores, resulting in the highest entity score in the current time frame.

Table 6 illustrates how the aggregated scores per entity for each time frame are compared to receive an entity trend score reflecting the trend of interest in the respective entity. For example, the entity "Senate Intelligence Committee" received a higher aggregated score for the current time frame compared to the previous time frame, resulting in a higher trend score than "FBI", which did not see as much change in aggregated scores over time. In contrast, the named entity "Donald Trump" received a significantly lower aggregated score for the current time frame compared to before, resulting in a trend score below 1, which represents a negative trend.

Ranking Update

Figure 6:
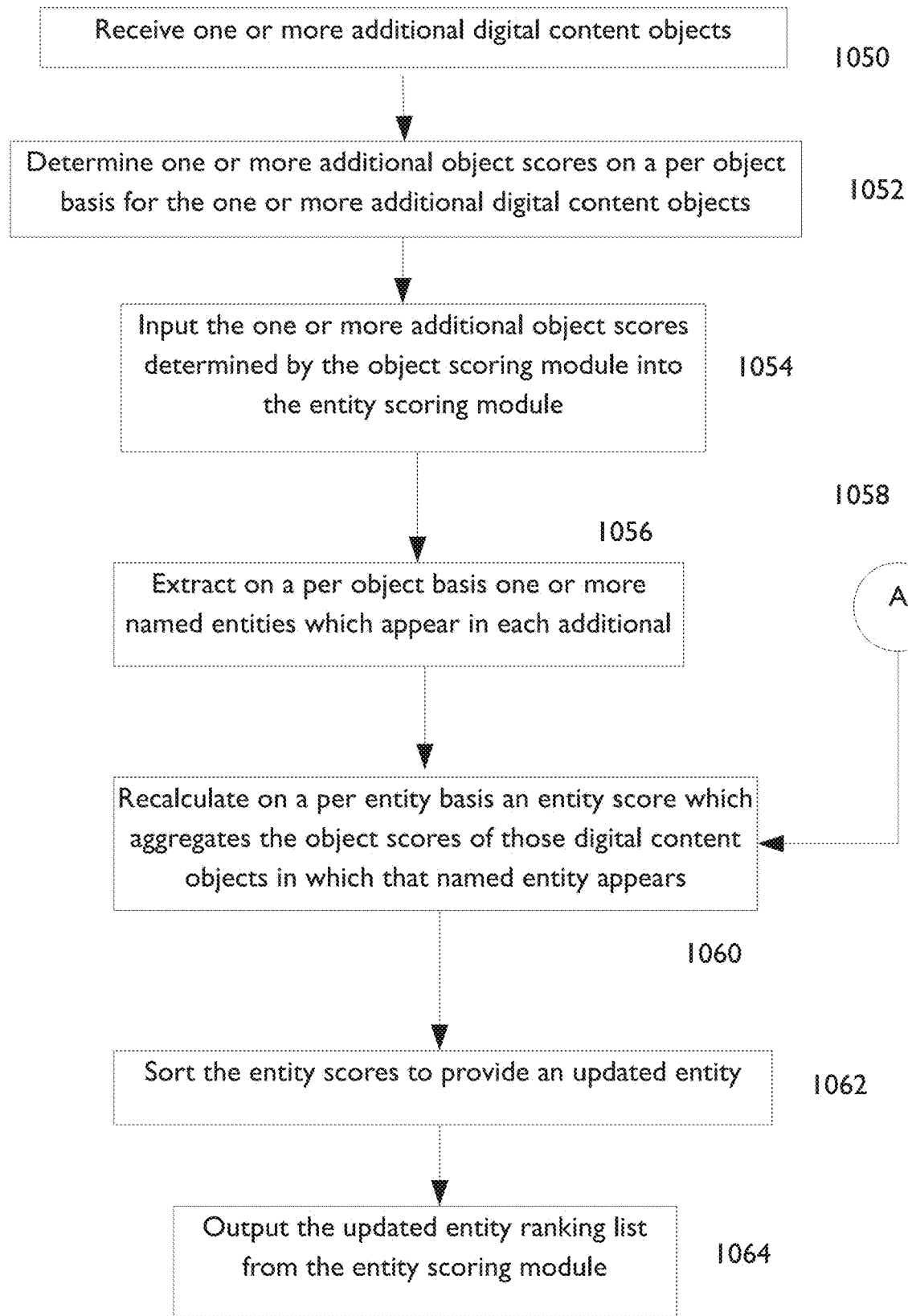
FIG. 6 is a flow chart illustrating an embodiment of a ranking update for an additional digital content object.

In at least one embodiment, the system is configured to update the ranking of the named entities upon receiving one or more additional digital content objects. Referring to FIG. 6, in at least one embodiment, at block 1050, the system 100 is configured to receive one or more additional digital content objects. For example, the data collection unit 10 is configured to continue monitoring and processing data from digital content object sources 102a, 102b . . . 102n and social network platforms 112a, 112b . . . 112n as described herein.

At block 1052, the object scoring module 300 determines one or more additional object scores on a per object basis for the one or more digital content objects. For example, the object scoring module 300 is also configured to recalculate digital content object scores based on social media metric values provided by the activity measurement module 200 as described herein. The entity scoring module 400 can then provide the one or more additional object scores determined by the object scoring module 300 into the entity scoring module.

At block 1056, the entity scoring module 400 is configured to employ the NER classifier 410 to extract on a per object basis one or more named entities that appear in each additional digital content object through analysis of its natural language element. At block 1060, the system 100 can then recalculate on a per entity basis the entity scores that aggregates the digital content object scores of those digital content objects in which that named entity appears.

In an embodiment, described in more detail below with respect to Example 2, the entity score can represents a change measured between a previous and a current time frame. The change recalculation is based on entity scores that aggregates the digital content object scores of those digital content objects in which that named entity appears.

At block 1062, if the recalculation results in a new entity ranking, the entity scoring module 400 resorts the entity scores to provide an updated entity ranking list. At block 1064, the entity scoring module 400 can then output the updated entity ranking list.

Figure 7:
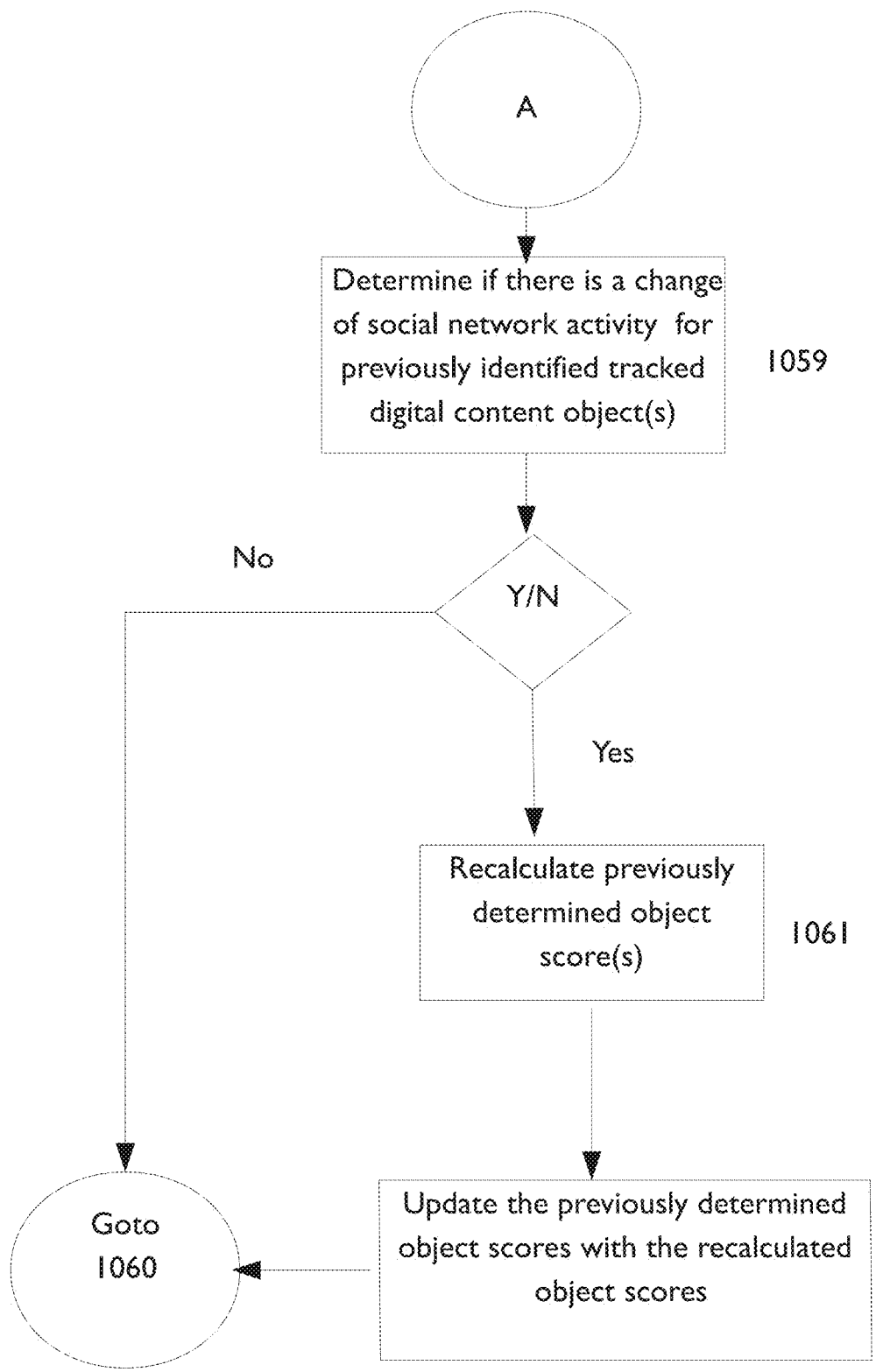
FIG. 7 is a flow chart illustrating an embodiment of the ranking update for a previously identified digital content object.

In at least one embodiment, the system 100 can be configured to update the ranking of previously identified digital content objects during the update. Referring to FIG. 7, prior to recalculating the entity score as described with respect to block 1060, the system 100 can determine if there is a change of social network activity for previously identified tracked digital content object(s) using the processes described herein. If there is no change, the system 100 continues to recalculate the entity scores as described with respect to block 1060. If there is a change, at block 1061, the object scoring module 300 recalculates one or more of the previously determined object scores. At block 1063, the object scoring module 300 updates the previously determined object scores with the recalculated object scores before recalculating the entity score. The object scoring module 300 can then input the one or more recalculated object scores determined by the object scoring module into the entity scoring module 400. The system 100 can then recalculate the entity score as described with respect to block 1060.

EXAMPLE 1

Processing Additional Digital Content Objects

An example is now given of processing a plurality of digital content objects, shown as five previously identified news stories and one additional new news story. It is understood that much larger sizes of objects are typically processed, however the illustration is sufficient to demonstrate system operation. Also, as will be appreciated, the system 100 can be configured to update each time a new digital content object is identified, or update periodically, and performing batch processing of additional digital content objects, if any.

TABLE 7

| Story summary (natural language element) | Extracted named entities - persons and organizations | Story Score |
|---|---|---|
| 1. "Reigning WBO world welterweight champion Timothy Bradley is not shutting his door for a possible third bout with Manny Pacquiao, but he also won't mind seeing Terence Crawford get the fight instead." | "WBO", "Timothy Bradley", "Manny Pacquiao", "Terence Crawford" | 380 |
| 2. "Boxing promoter Bob Arum is keenly waiting for Manny Pacquiao to make his final decision regarding his choice of foe for his supposed farewell fight on April 9." | "Bob Arum", "Manny Pacquiao" | 117 |
| 3. "American Timothy Bradley says he will rely on a "way different" strategy built on a highly detailed game plan when he defends his WBO." | "Timothy Bradley" "WBO" | 165 |
| 4. "Former world boxing champion Manny Pacquiao said on Monday TV coverage of his WBO welterweight bout with American Timothy Bradley would not violate Philippine election laws or give him an undue advantage in his bid for a seat on the Senate." | "Manny Pacquiao" "WBO" "Timothy Bradley" "Senate" | 72 |
| 5. "Bob Arum may not share Manny Pacquiao's opinion on same-sex marriage, but the Top Rank chief executive said he will defend "to the death" the Filipino boxer's right to express his beliefs." | "Bob Arum" "Manny Pacquiao" "Rank" | 120 |
| 6. "WBO welterweightboxer Terence Crawford announces he wants to take on undefeated WBC champion Viktor Postol." | "WBO", "Terrence Crawford", "WBC", "Viktor Posto" | 460 |

TABLE 8

| | Ranking of named entities: | | |
|---|---|---|---|
| Rank | Named Entity | Entity Score | Comment |
| 1. | "Terrance Crawford" | (380 + 460)/2 + 420 | mentioned in two stories, both of which are currently strongly trending |
| 2. | "WBO" | (380 + 165 + 72 + 460)/4 = 269 | mentioned in several stories, two of which are currently strongly trending |
| 3. | "Timothy Bradley" | (380 + 165 + 72)/3 = 229 | mentioned in several stories, one of which is currently strongly trending |
| 4. | "Bob Arum" | (117 + 120)/2 = 119 | mentioned in two stories, none of which is currently strongly trending |

In the example above in Table 7, the entity ranking module 400 employs the machine executable NER classifier code to extract named entities from the natural language element of each news story and adds any new named entities (i.e.: "WBC" and "Viktor Posto") from the new story. The object scoring module 300 scores the new news story, and also recalculates the scores of the previously identified news stories based on changes in the social network activity values. The entity ranking module 400 then recalculates the score per entity as described herein, including any new or existing entities identified by the NER classifier 410 and not filtered by an exclusion filter.

This example shows how recalculating of the averaging of the story scores per entity, results in re-ranking for entities that are mentioned in stories. For example, Named Entity "Terrance Crawford" is now added to the Ranked Entity list in the first rank as he is mentioned in two stories (1 and 6), one being new and both having "strongly trending" story scores of 380 and 460. Before the update, "Terrance Crawford" was in only one story, and hence was previously filtered by the exclusion filter of the entity scoring module 400. Also, in the previous story, he was recognized in before the update had a low story score of 190, whereas after the update, the recalculated story score shows the story has been strongly trending, having a story score of 380. The named entity "Manny Pacquiao" is still mentioned in 4 of 6 story Summaries (1, 2, 4 and 5), however the Named Entity rank has changed from of 2 to 5 due to the recalculated story scores and named entity list, "Bob Arum", has dropped from 1 to 4. Also, the story scores for Summaries 3 (165) and 4 (172) remained the same.

EXAMPLE 2

Processing Additional Digital Content Objects

In an embodiment, the entity scoring module 400 can be configured to update trend scores that measure change between a previous and a current time frame. The change recalculation is based on entity scores that aggregates the digital content object scores of those digital content objects in which that named entity appears as shown with respect to FIG. 5B.

An example is now described for an embodiment of processing a plurality of digital content objects, shown as five previously identified news stories and one additional, new news story. It is understood that much larger sizes of objects are typically processed, however the illustration is sufficient to demonstrate system operation. Also, as will be appreciated, the system can be configured to update each time a new digital content object is identified, or update periodically, and performing batch processing of additional digital content objects, if any.

TABLE 9

| Stories and named entities in current time frame | | |
|---|---|---|
| Story summary (natural language element) | Extracted named entities - persons and organizations | Story Score |
| 1. "James Comey testifies that Donald Trump lied in describing the reasons he was fired." | "James Comey", "Donald Trump" | 180 |
| 2. "James Comey will testify before the Senate Intelligence Committee on Thursday." | "Senate Intelligence Committee", "James Comey" | 154 |

TABLE 9-continued

Stories and named entities in current time frame

| Story summary (natural language element) | Extracted named entities - persons and organizations | Story Score |
|---|---|---|
| 3. "The Senate Intelligence Committee released on Wednesday remarks prepared by former FBI Director James Comey for delivery the next day." | "Senate Intelligence Committee", "FBI", "James Comey" | 225 |
| 4. "House Speaker Paul Ryan said it's "obviously" inappropriate for President Donald Trump to have asked ousted FBI Director James Comey to pledge his loyalty." | "Paul Ryan", "Donald Trump", "FBI", "James Comey" | 190 |
| 5. "James Comey testified Thursday that the FBI expected Jeff Sessions to recuse himself from the Russia investigation." | "Russia", "Jeff Sessions", "FBI", "James Comey" | 85 |
| 6. "Aides to President Donald Trump are urging him not to fire Attorney General Jeff Sessions despite rifts between the two men" | "Donald Trump", "Jeff Sessions" | 75 |
| Σ | | 909 |

TABLE 10

Stories and named entities in preceding (historical) time frame

| Story summary (natural language element) | Extracted named entities - persons and organizations | Story Score |
|---|---|---|
| 1. "London Mayor Sadiq Khan is calling on the British government to cancel a state visit from President Donald Trump after Trump criticized his response to this weekend's terror attacks in London." | "London", "Sadiq Khan", "Donald Trump" | 250 |
| 2. "Documents reveal the role of an FBI informant on the night nonviolent protesters at Standing Rock were sprayed with water and rubber bullets." | "FBI", "Standing Rock" | 138 |
| 3. "CBS has announced that they will be airing James Comey's testimony before the Senate Intelligence Committee live on broadcast television" | "CBS", "James Comey", "Senate Intelligence Committee" | 150 |
| 4. "President Donald Trump's approval rating is at 34%, a new Quinnipiac poll released Wednesday finds" | "Donald Trump", "Quinnipiac" | 75 |
| 5. "The White House is reportedly struggling to recruit strong candidates who want to serve as President Donald Trump's FBI director." | "White House", "FBI", "Donald Trump" | 186 |
| 6. "Attorney General Jeff Sessions announced a new policy prohibiting payouts to third parties in settlements reached by the Justice Department." | "Jeff Sessions", "Justice Department" | 60 |
| Σ | | 859 |

TABLE 11

Scoring of named entities:

| Named Entity | Entity Score (now) | Entity Score (history) |
|---|---|---|
| "James Comey" | (180 + 154 + 225 + 190 + 85)/909 = 0.917 | 150/859 = 0.1746 |
| "Donald Trump" | (180 + 190 + 75)/909 = 0.489 | (250 + 75 + 186)/859 = 0.595 |
| "FBI" | (225 + 190 + 85)/909 = 0.539 | (138 + 186)/859 = 0.3772 |
| "Senate Intelligence Committee" | (154 + 225)/909 = 0.4169 | 150/859 = 0.1746 |
| "Jeff Sessions" | (85 + 75)/909 = 0.176 | 60/859 = 0.0698 |

TABLE 12

Ranking of named entities:

| Rank | Named Entity | Entity Score (Trend) | Comment |
|---|---|---|---|
| 1. | "James Comey" | 0.917/0.1746 = 5.252 | Mentioned in several trending stories now, compared to only one story before. |
| 2 | "Jeff Sessions" | 0.176/0.0698 = 2.521 | Mentioned in two smaller stories now, compared to only one story before. |
| 3. | "Senate Intelligence Committee" | 0.4169/0.1746 = 2.3877 | Mentioned in two trending stories now, compared to only one story before. |
| 4. | "FBI" | 0.539/0.3772 = 1.4289 | Mentioned in two trending stories and one smaller story now and two stories before. |
| 5. | "Donald Trump" | 0.489/0.595 = 0.822 | Mentioned in three stories in both time frames |

In the example above in Table 9, the entity ranking module 400 employs the machine executable NER classifier code to extract named entities from the natural language element of each news story and adds any new named entities from the new story. The object scoring module 300 scores the new news story, and also recalculates the scores of the previously identified news stories based on changes in the social network activity values. The entity ranking module 400 then recalculates the score per entity as described herein, including any new or existing entities identified by the NER classifier 410 and not filtered by an exclusion filter (Tables 11 and 12).

This example shows how recalculating of the aggregation of the story scores per entity, results in re-ranking for entities that are mentioned in stories. For example, Named Entity "Jeff Sessions" is now added to the Ranked Entity list in the second rank as he is mentioned in two stories (9 and 10), one being new. Before the update, "Jeff Sessions" was in only one story, and hence was previously filtered by the exclusion filter of the entity scoring module 400. Although this entity is associated with lower story scores than some of the other entities, the significant change in relative interest over time (i.e. from an entity score of 0.06 in the previous time frame to 0.176 in the current time frame) results in a higher trend score. The remaining entities "James Comey", "Senate Intelligence Committee" and "FBI" receive a slightly lower trend score than in Table 6 of Example 1, while "Donald Trump" receives a slightly higher trend score, due to changes in the social network activity values.

Illustrative Operating Environment

Figure 8:
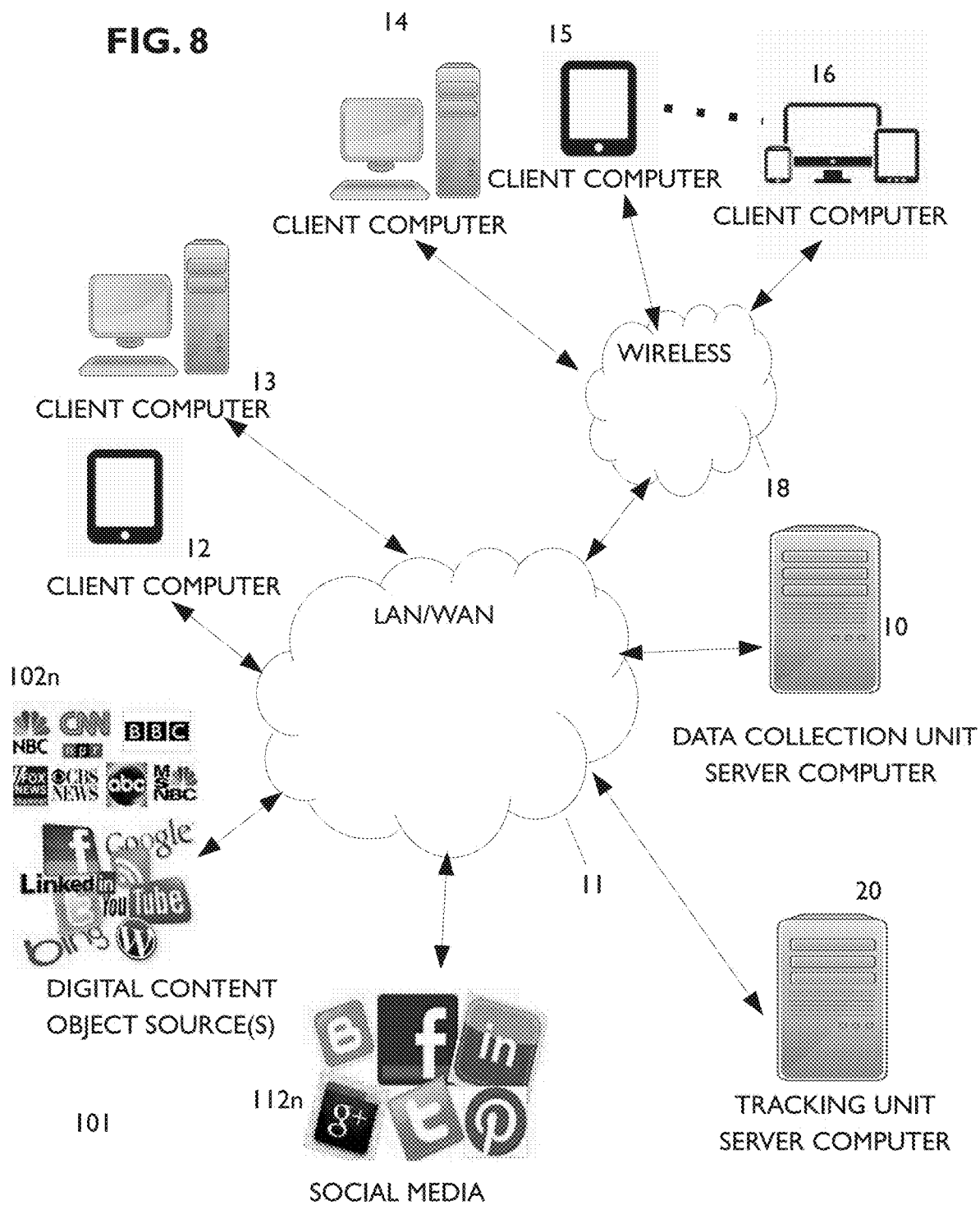
FIG. 8 shows an embodiment of an environment in which the present embodiments can be practiced.

FIG. 8 shows components of an embodiment of an environment 101 in which embodiments of the present disclosure can be practiced. Not all of the components may be required to practice the innovations, and variations in the arrangement and type of the components can be made without departing from the spirit or scope of the present disclosure. As shown, FIG. 8 includes local area networks (LANs)/wide area networks (WANs)—(network) 11, wireless network 18, client computers 12-16, data collection unit or Data Collection Unit Server Computer 10, trending unit or Tracking Unit Server Computer 20, Social Media Server Computer 112n, and Digital Content Object Source(s) Computer 102n.

At least one embodiment of client computers 12-16 is described in more detail below in conjunction with FIG. 10. In one embodiment, at least some of client computers 12-16 can operate over a wired and/or wireless network, such as networks 11 and/or 18. Generally, client computers 12-16 can include virtually any computer capable of communicating over a network to send and receive information, perform various online activities, offline actions, or the like. In one embodiment, one or more of client computers 12-16 can be configured to operate in a business or other entity to perform a variety of services for the business or other entity. For example, client computers 12-16 can be configured to operate as a web server or an account server. However, client computers 12-16 are not constrained to these services and can also be employed, for example, as an end-user computing node, in other embodiments. It should be recognized that more or less client computers can be included within a system such as described herein, and embodiments are therefore not constrained by the number or type of client computers employed.

Computers that can operate as client computer 12 can include computers that typically connect using a wired or wireless communications medium such as personal computers, multiprocessor systems, microprocessor-based or programmable electronic devices, network PCs, or the like. In some embodiments, client computers 12-16 can include virtually any portable personal computer capable of connecting to another computing device and receiving information, such as, laptop computer 13, smart mobile telephone/computer 12, and tablet computers 15, and the like. However, portable computers are not so limited and can also include other portable devices, such as cellular telephones, radio frequency (RF) devices, infrared (IR) devices, Personal Digital Assistants (PDAs), handheld computers, wearable computers, integrated devices combining one or more of the preceding devices 12-16, and the like. As such, client computers 12-16 typically range widely in terms of capabilities and features. Moreover, client computers 12-16 are configured to access various computing applications, including a browser, or other web-based applications.

A web-enabled client computer can include a browser application that is configured to receive and to send web pages, web-based messages, and the like. The browser application can be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, JavaScript Object Notation (JSON), Standard Generalized Markup Language (SGML), HyperText Markup Language (HTML), eXtensible Markup Language (XML), and the like, to display and send a message. In one embodiment, a user of the client computer can employ the browser application to perform various activities over a network (online). However, another application can also be used to perform various online activities.

Client computers 12-16 can also include at least one other client application that is configured to receive and/or send content with another computer. The client application can include a capability to send and/or receive content, or the like. The client application can further provide information that identifies itself, including a type, capability, name, and the like. In one embodiment, client computers 12-16 can uniquely identify themselves through any of a variety of mechanisms, including an Internet Protocol (IP) address, a phone number, Mobile Identification Number (MIN), an electronic serial number (ESN), or other device identifier. Such information can be provided in a network packet, or the like, sent between other client computers, Data Collection Server Computer 10, Trending Unit Server Computer 20, or other computers.

Client computers 12-16 can further be configured to include a client application that enables an end-user to log into an end-user account that can be managed by another computer, such as Data Collection Server Computer 10, Trending Unit Server Computer 20, Social Media Server Computer 112n, Digital Content Object Source(s) Computer 102n, or the like. Such end-user account, in one non-limiting example, can be configured to enable the end-user to manage one or more online activities, including in one non-limiting example, search activities, social networking activities, browse various websites, communicate with other users, or the like. However, participation in such online activities can also be performed without logging into the end-user account.

Wireless network 18 is configured to couple client computers 14-16 and its components with network 11. Wireless network 18 can include any of a variety of wireless sub-networks that can further overlay stand-alone ad-hoc networks, and the like, to provide an infrastructure-oriented connection for client computers 14-16. Such sub-networks can include mesh networks, Wireless LAN (WLAN) networks, cellular networks, and the like. In one embodiment, the system can include more than one wireless network.

Wireless network 18 can further include an autonomous system of terminals, gateways, routers, and the like connected by wireless radio links, and the like. These connectors can be configured to move freely and randomly and organize themselves arbitrarily, such that the topology of wireless network 18 can change rapidly.

Wireless network 18 can further employ a plurality of access technologies including 2nd (2G), 3rd (3G), 4th (4G) 5th (5G) generation radio access for cellular systems, WLAN, Wireless Router (WR) mesh, and the like. Access technologies, such as 2G, 3G, 4G, 5G, and future access networks can enable wide area coverage for mobile devices, such as client computers 14-16 with various degrees of mobility. In one non-limiting example, wireless network 18 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 18 can include virtually any wireless communication mechanism by which information may travel between client computers 14-16 and another computer, network, and the like.

Network 11 is configured to couple network computers with other computers and/or computing devices, including, Data Collection Server Computer 10, Trending Unit Server Computer 20, Social Media Server Computer 112n, Digital Content Object Source(s) Computer 102n, client computers 12, 13 and client computers 14-16 through wireless network 18. Network 11 is enabled to employ any form of computer readable media for communicating information from one electronic device to another. Also, network 11 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links in LANs typically include twisted wire pair or coaxial cable, while communication links between networks can utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links can further employ any of a variety of digital signalling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 11 can be configured to transport information of an Internet Protocol (IP). In essence, network 11 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of a server computer that can be employed as a Data Collection Unit Server Computer 10 or a Trending Unit Server Computer 12 is described in more detail below in conjunction with FIG. 9. Briefly, server computer includes virtually any network computer capable of hosting the modules for the Data Collection Unit Server Computer 10 and Trending Unit Sever Computer 20 as described herein. Computers that can be arranged to operate as a server computer include various network computers, including, but not limited to, desktop computers, multiprocessor systems, microprocessor-based or programmable consumer electronics, network PCs, server computers, network appliances, and the like.

Although FIG. 8 illustrates each of Data Collection Unit Server Computer 10 and Trending Unit Server Computer 20 as a single computer, the present disclosure is not so limited. For example, one or more functions of server computer can be distributed across one or more distinct network computers. Moreover, the computer servers are not limited to a particular configuration. Thus, in one embodiment, a server computer can contain a plurality of network computers. In another embodiment, a server computer can contain a plurality of network computers that operate using a master/slave approach, where one of the plurality of network computers of the server computers are operative to manage and/or otherwise coordinate operations of the other network computers. In other embodiments, a server computer can operate as a plurality of network computers arranged in a cluster architecture, a peer-to-peer architecture, and/or even in a cloud architecture. Thus, the present disclosure is not to be construed as being limited to a single environment, and other configurations, and architectures are also envisaged.

Although illustrated separately, Data Collection Unit Server Computer 10 and Trending Unit Server Computer 20 can be employed as a single network computer, separate network computers, a cluster of network computers, or the like. In some embodiments, either Data Collection Unit Server Computer 10 or Trending Unit Server Computer 20, or both, can be enabled to deliver content, respond to user interactions with the content, track user interaction with the content, update widgets and widgets controllers, or the like. Moreover, although Data Collection Unit Server Computer 10 and Trending Unit Server Computer 20 are described separately, it will be appreciated that these servers hosted by or configured to operate on Social Media Server Computer 112n, Digital Content Object Source(s) Computer 102n or other platforms.

Illustrative Network Computer

Figure 9:
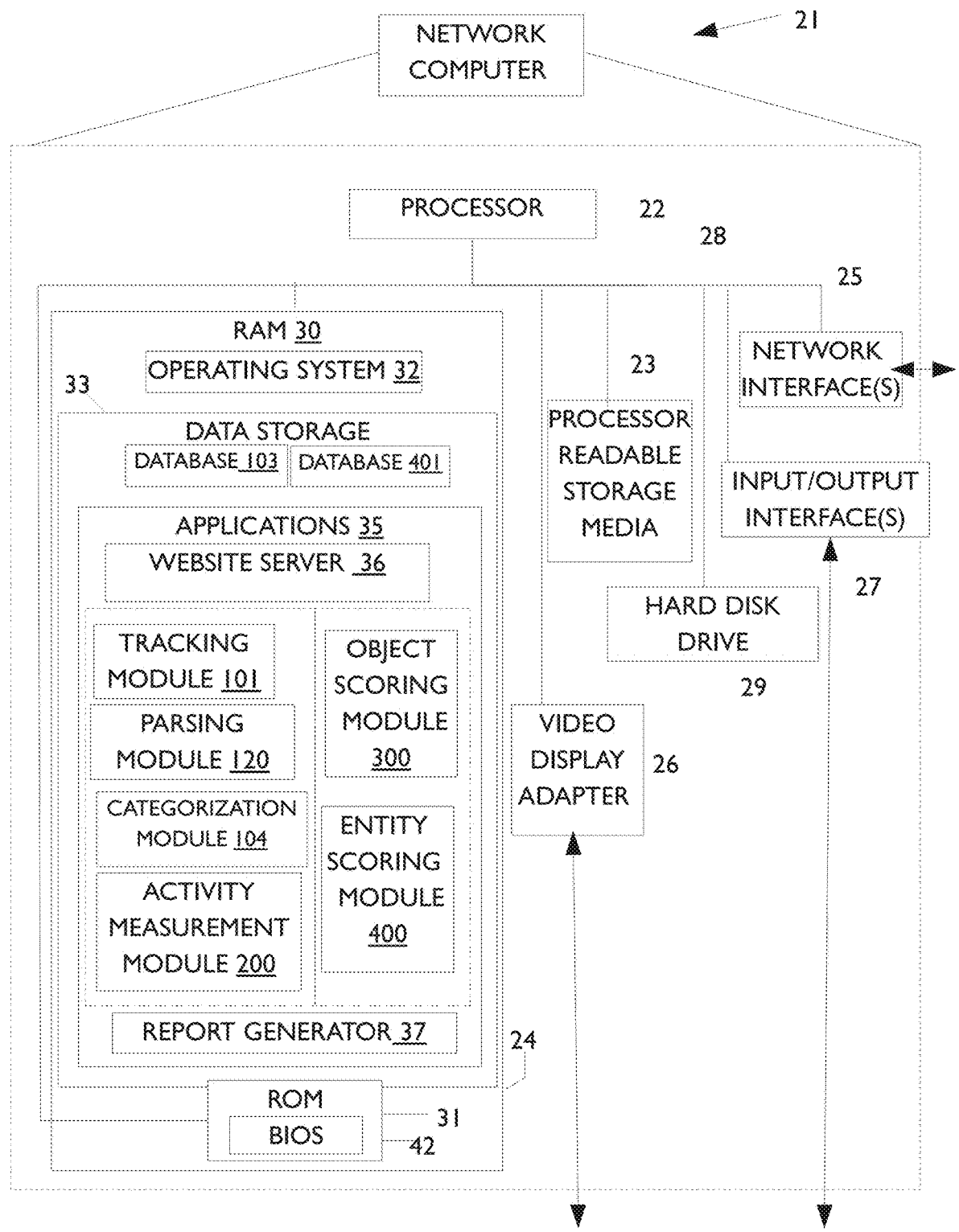
FIG. 9 shows an embodiment of a network computer that can be included in a system such as that shown in FIGS. 1 and 8.

FIG. 9 shows one embodiment of a network computer 21 according to one embodiment of the present disclosure. Network computer 21 can include many more or less components than those shown. The components shown, however, are sufficient to disclose an illustrative embodiment for practicing the invention. Network computer 21 can be configured to operate as a server, client, peer, a host, or any other computer. Network computer 21 can represent, for example Data Collection Unit Server Computer 10 and/or Trending Unit Server Computer 20 of FIG. 8, and/or other network computers.

Network computer 21 includes processor 22, processor readable storage media 23, network interface unit 25, an input/output interface 27, hard disk drive 29, video display adapter 26, and memory 24, all in communication with each other via bus 28. In some embodiments, processor 22 can include one or more central processing units.

As illustrated in FIG. 9, network computer 21 also can communicate with the Internet, or some other communications network, via network interface unit 25, which is constructed for use with various communication protocols including the TCP/IP protocol. Network interface unit 25 is sometimes known as a transceiver, transceiving device, or network interface card (NIC).

Network computer 21 also comprises input/output interface 27 for communicating with external devices, such as a keyboard, or other input or output devices not shown in FIG. 9. Input/output interface 27 can utilize one or more communication technologies, such as USB, infrared, Bluetooth™, or the like.

Memory 24 generally includes RAM 30, ROM 31 and one or more permanent mass storage devices, such as hard disk drive 29, tape drive, optical drive, and/or floppy disk drive. Memory 24 stores operating system 32 for controlling the operation of network computer 21. Any general-purpose operating system can be employed. Basic input/output system (BIOS) 42 is also provided for controlling the low-level operation of network computer 21.

Although illustrated separately, memory 24 can include processor readable storage media 23. Processor readable storage media 23 can be referred to and/or include computer readable media, computer readable storage media, and/or processor readable storage device. Processor readable storage media 23 can include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media that can be used to store the desired information and which can be accessed by a computer.

Memory 24 further includes one or more data storage 33, which can be utilized by network computer 21 to store, among other things, applications 35 and/or other data. For example, data storage 33 can also be employed to store information that describes various capabilities of network computer 21. The information can then be provided to another computer based on any of a variety of events, including being sent as part of a header during a communication, sent upon request, or the like. Data storage 33 can also be employed to store messages, web page content, or the like. At least a portion of the information can also be stored on another component of network computer 21, including, but not limited to processor readable storage media 23, hard disk drive 29, or other computer readable storage medias (not shown) in client computer 21.

Data storage 33 can include a database, text, spreadsheet, folder, file, or the like, that can be configured to maintain and store user account identifiers, user profiles, email addresses, IM addresses, and/or other network addresses; or the like.

In at least one of the various embodiments, data storage 33 can include databases, for example digital content object database 103, summary database 401, and other databases that can contain information determined from digital content object tracking and social network activity metrics as described herein.

Data storage 33 can further include program code, data, algorithms, and the like, for use by a processor, such as processor 22, to execute and perform actions. In one embodiment, at least some of data store 33 might also be stored on another component of network computer 21, including, but not limited to processor-readable storage media 23, hard disk drive 29, or the like.

Applications 35 can include computer executable instructions, which may be loaded into mass memory and run on operating system 32. Examples of application programs can include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 35 can also include website server 36, Tracking Module 101, Parsing Module 120, Categorization Module 104, Activity Measurement Module 200, Object Scoring Module 300, Entity Scoring Module 400, and Report Generator 37.

Website server 36 can represent any of a variety of information and services that are configured to provide content, including messages, over a network to another computer. Thus, website server 36 can include, for example, a web server, a File Transfer Protocol (FTP) server, a database server, a content server, or the like. Website server 36 can provide the content including messages over the network using any of a variety of formats including, but not limited to WAP, HDML, WML, SGML, HTML, XML, Compact HTML (cHTML), Extensible HTML (xHTML), or the like.

Tracking Module 101, Parsing Module 120, Categorization Module 104, and Activity Measurement Module 200 can be hosted and operative on Data Collection Unit Server Computer 10. In at least one of the various embodiments, Tracking Module 101, Parsing Module 120, Categorization Module 104, and Activity Measurement Module 200 can operate on Digital Collection Unit Server Computer 10 of FIG. 8. Tracking Module 101 can employ processes, or parts of processes, similar to those described in conjunction with FIGS. 1-7 to perform at least some of its actions.

The Object Scoring Module 300 and Entity Scoring Module 400 can be hosted and operative on Tracking Unit Server Computer 20 of FIG. 8. The Object Scoring Module 300 and Entity Scoring Module 400 can employ processes, or parts of processes, similar to those described in conjunction with FIGS. 1-7 and FIG. 11 to perform at least some of its actions.

Report Generator 37 can be arranged and configured to determine and/or generate reports based on the user filters and controls similar to those described above with reference to the user interface 30 controls. Also, report generator 37 can be configured to output a tailored report, either in the form of publishing software application which prepares and outputs a type-set digest of the digital content objects in a convenient-to-read form, or the same information output in a format suitable for automatic input and processing by another software product, for example, plain text for a publishing program such as LaTeX. In at least one embodiment, Report Generator 37 can be operative on hosted and operative on Tracking Unit Server Computer 20 or Data Collection Unit Server Computer 10 of FIGS. 1A and 1B. Report Generator 37 can employ processes, or parts of processes, similar to those described in conjunction with FIGS. 1-7 and FIG. 11 to perform at least some of its actions.

Illustrative Client Computer

Figure 10:
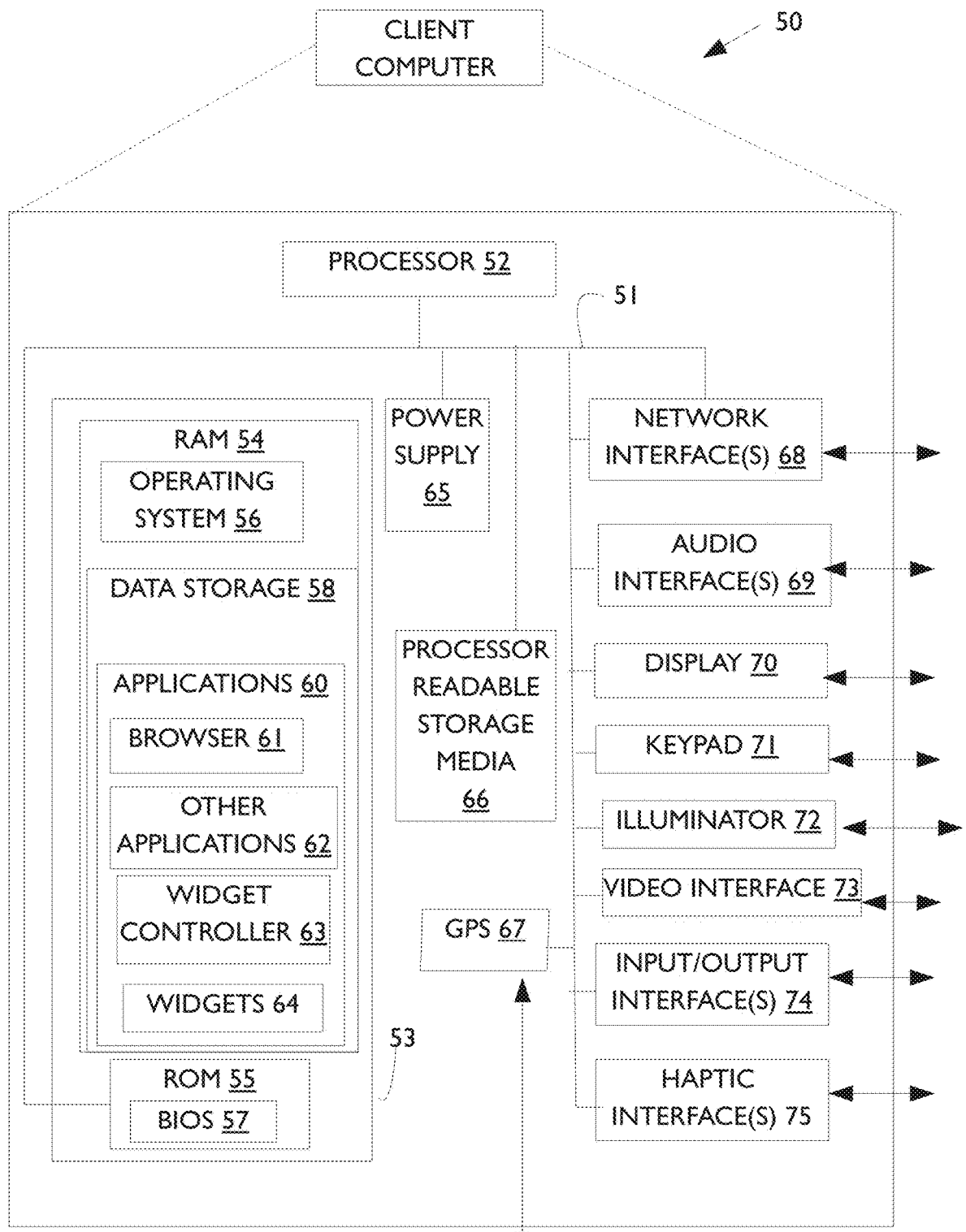
FIG. 10 shows an embodiment of client computer that can be included in a system such as that shown in FIGS. 1 and 8.

Referring to FIG. 10, client computer 50 can include many more or less components than those shown in FIG. 10. However, the components shown are sufficient to disclose an illustrative embodiment for practicing the present disclosure. Client Computer 50 can represent, for example, one embodiment of at least one of Client Computers 12-16 of FIG. 8.

As shown in the figure, Client Computer 50 includes a processor 52 in communication with a mass memory 53 via a bus 51. In some embodiments, processor 50 includes one or more central processing units (CPU). Client Computer 50 also includes a power supply 65, one or more network interfaces 68, an audio interface 69, a display 70, a keypad 71, an illuminator 72, a video interface 73, an input/output interface 74, a haptic interface 75, and a global positioning system (GPS) receiver 67.

Power supply 65 provides power to Client Computer 51. A rechargeable or non-rechargeable battery can be used to provide power. The power can also be provided by an external power source, such as an alternating current (AC) adapter or a powered docking cradle that supplements and/or recharges a battery.

Client Computer 50 may optionally communicate with a base station (not shown), or directly with another computer. Network interface 68 includes circuitry for coupling Client Computer 50 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 68 is sometimes known as a transceiver, transceiving device, or network interface card (NIC).

Audio interface 69 is arranged to produce and receive audio signals such as the sound of a human voice. For example, audio interface 69 can be coupled to a speaker and microphone (not shown) to enable telecommunication with others and/or generate an audio acknowledgement for some action.

Display 70 can be a liquid crystal display (LCD), gas plasma, light emitting diode (LED), organic LED, or any other type of display used with a computer. Display 70 can also include a touch sensitive screen arranged to receive input from an object such as a stylus or a digit from a human hand.

Keypad 71 can comprise any input device arranged to receive input from a user. For example, keypad 71 can include a push button numeric dial, or a keyboard. Keypad 71 can also include command buttons that are associated with selecting and sending images.

Illuminator 72 can provide a status indication and/or provide light. Illuminator 72 can remain active for specific periods of time or in response to events. For example, when illuminator 72 is active, it can backlight the buttons on keypad 71 and stay on while the Client Computer is powered. Also, illuminator 72 can backlight these buttons in various patterns when particular actions are performed, such as dialing another client computer. Illuminator 72 can also cause light sources positioned in a transparent or translucent case of the client computer to illuminate in response to actions.

Video interface 73 is arranged to capture video images, such as a still photo, a video segment, an infrared video, or the like. For example, video interface 73 can be coupled to a digital video camera, a web-camera, or the like. Video interface 73 can comprise a lens, an image sensor, and other electronics. Image sensors can include a complementary metal-oxide-semiconductor (CMOS) integrated circuit, charge-coupled device (CCD), or any other integrated circuit for sensing light.

Client computer 50 also comprises input/output interface 74 for communicating with external devices, such as a headset, or other input or output devices not shown in FIG. 10. Input/output interface 74 can utilize one or more communication technologies, such as USB, infrared, Bluetooth™, or the like.

Haptic interface 75 is arranged to provide tactile feedback to a user of the client computer. For example, the haptic interface 75 can be employed to vibrate client computer 75 in a particular way when another user of a computing computer is calling. In some embodiments, haptic interface 75 is optional.

Client computer 50 can also include GPS transceiver 67 to determine the physical coordinates of client computer 50 on the surface of the Earth. GPS transceiver 67, in some embodiments, is optional. GPS transceiver 67 typically outputs a location as latitude and longitude values. However, GPS transceiver 67 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 50 on the surface of the Earth. It is understood that under different conditions, GPS transceiver 67 can determine a physical location within millimeters for client computer 50. In other cases, the determined physical location may be less precise, such as within a meter or significantly greater distances. In one embodiment, however, client computer 50 can, through other components, provide other information that can be employed to determine a physical location of the computer, including for example, a Media Access Control (MAC) address, IP address, or the like.

Mass memory 53 includes a Random Access Memory (RAM) 54, a Read-only Memory (ROM) 55, and other storage means. Mass memory 53 illustrates an example of computer readable storage media (devices) for storage of information such as computer readable instructions, data structures, program modules or other data. Mass memory 53 stores a basic input/output system (BIOS) 57 for controlling low-level operation of client computer 50. The mass memory also stores an operating system 56 for controlling the operation of client computer 50. It will be appreciated that this component can include a general-purpose operating system such as a version of UNIX, or LINUX™, or a specialized client communication operating system such as Microsoft Corporation's Windows™ OS, Apple Corporation's iOS™, Google Corporation's Android™ or the Symbian® operating system. The operating system can include, or interface with a Java virtual machine module that enables control of hardware components and/or operating system operations via Java application programs.

Mass memory 53 further includes one or more data storages 58 that can be used by client computer 50 to store, among other things, applications 60 and/or other data. For example, data storage 58 can also be employed to store information that describes various capabilities of client computer 50. The information can then be provided to another computer based on any of a variety of events, including being sent as part of a header during a communication, sent upon request, or the like. Data storage 58 can also be employed to store social networking information including address books, buddy lists, aliases, user profile information, or the like. Further, data storage 58 can also store message, web page content, or any of a variety of user generated content. At least a portion of the information can also be stored on another component of client computer 50, including, but not limited to, processor readable storage media 66, a disk drive or other computer readable storage devices (not shown) in client computer 50.

Processor readable storage media 66 can include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium that can be used to store the desired information and which can be accessed by a computer. Processor readable storage media 66 is also referred to herein as computer readable storage media and/or computer readable storage device.

Applications 60 can include computer executable instructions which, when executed by client computer 50, transmit, receive, and/or otherwise process network data. Network data includes, but is not limited to, messages (e.g. SMS, Multimedia Message Service (MMS), instant message (IM), email, and/or other messages), audio, video, and enable telecommunication with another user of another client computer. Applications 60 can include, for example, browser 61, and other applications 62. Other applications 62 include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 61 can include virtually any application configured to receive and display graphics, text, multimedia, messages, and the like, employing virtually any web based language. In one embodiment, the browser application employs HDML, WML, WMLScript, JavaScript, JSON, SGML, HTML, XML, and the like, to display and send a message. However, any of a variety of other web-based programming languages can be employed. In one embodiment, browser 61 enables a user of client computer 50 to communicate and interface with another network computer, such as Data Collection Unit Server Computer 10 and/or Tracking Unit Server Computer 20, Social Media Server Computer 112n, Digital Content Object Source(s) Computer 102n of FIG. 8 such that a user can operate a user interface 30 as described herein.

Applications 60 can also include Widget Controller 63 and one or more Widgets 64. Widgets 64 can be collections of content provided to the client computer by Data Communication Server Computer 10, Tracking Unit Server Computer 20, Social Media Server Computer 112n, or Digital Content Object Source(s) Computer 102n. Widget Controller 63 can be a program provided to the client computer by Data Communication Server Computer 10, Tracking Unit Server Computer 20, Social Media Server Computer 112n, or Digital Content Object Source(s) Computer 102n. Widget Controller 63 and Widgets 64 can run as native client computer applications or they can run in Browser 61 as web browser based applications. Also, Widget Controller 63 and Widgets 64 can be arranged to run as native applications or web browser applications, or combination thereof. In one embodiment, browser 61 employs Widget Controller 63 and Widgets 64 to enable a user of client computer 50 to communicate and interface with another network computer, such as Data Collection Unit Server Computer 10 Tracking Unit Server Computer 20, Social Media Server Computer 112n and/or Digital Content Object Source(s) Computer 102n of FIG. 8 such that a user can operate a user interface 30 as described herein.

Illustrative User Interface Use Case

Figure 11:
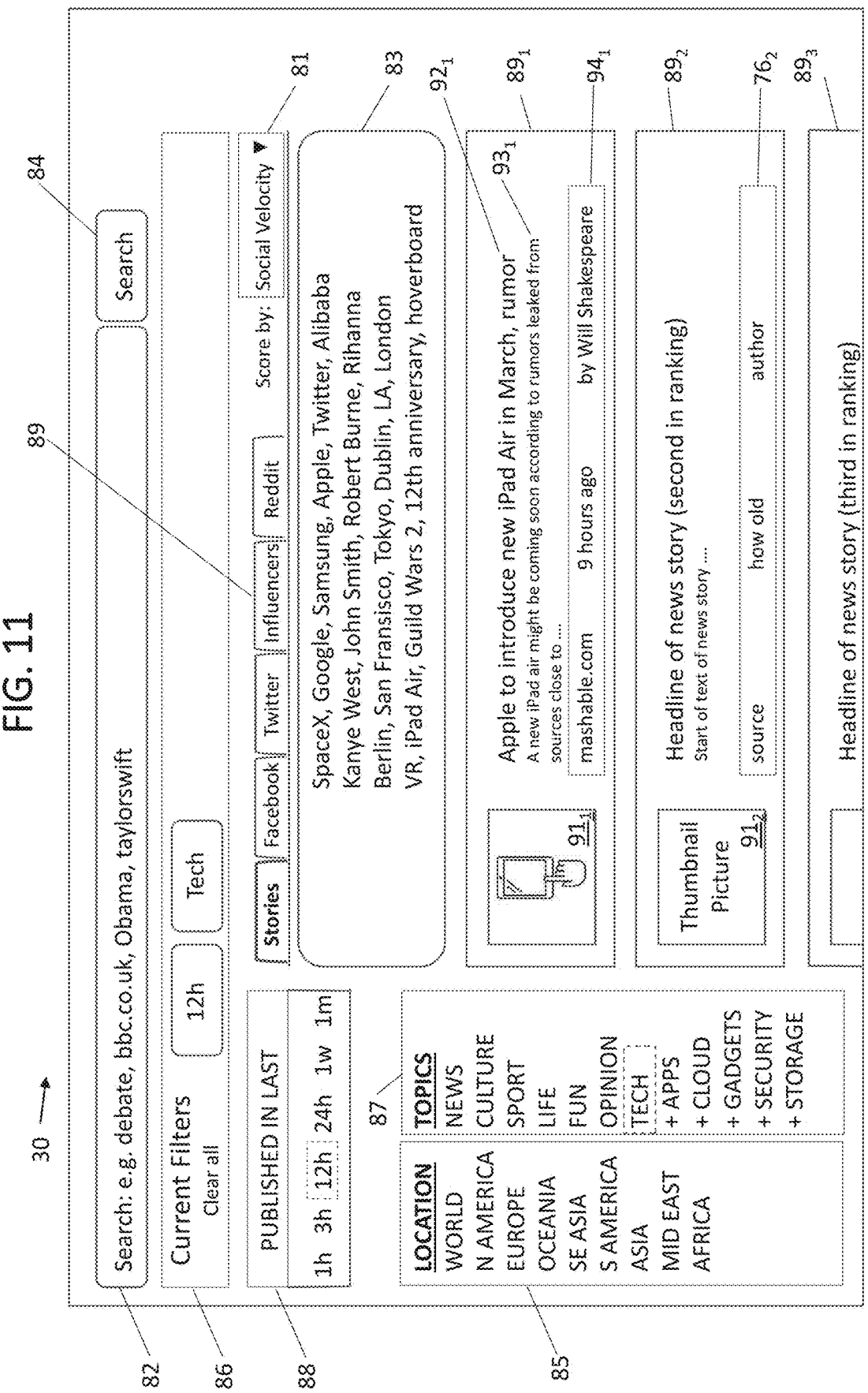
FIG. 11 shows schematically an example graphical user interface according an embodiment.

Referring to FIG. 11, in at least one of the various embodiments, user interfaces other than user interface 30, can be employed without departing from the spirit and/or scope of the present disclosure. Such user interfaces can have more or fewer user interface elements that are arranged in various ways. In some embodiments, user interfaces can be generated using web pages, mobile applications, emails, PDF documents, text messages, or the like. In at least one of the various embodiments, Tracking Module 101, Parsing Module 120, Categorization Module 104, Activity Measurement Module 200, Object Scoring Module 300, and/or Entity Scoring Module 400 include processes and/or API's for generating user interfaces, such as, user interface 30.

The user interface unit 80 is now described in more detail.

FIG. 11 shows a home screen user interface 30 as an example user graphical user interface, referred to as a dashboard. A search entry box 82 with adjacent action button 84 allows a user to type in a search query to be searched by a search engine that forms part of the system. The search engine (e.g. ElasticSearch) allows a search of all available digital content objects, such as stories in the system. The search query can be a general one using keywords and can also specify one or more domains in which the search should be restricted. A bar 86 across the screen shows the filters that are currently being applied together with a "Clear all" button option to reset to no filtering. There are currently two active filters shown, one "12 h" indicating that only news stories in the last 12 hours are included in the results and another "Tech" showing that only news stories with the subject (i.e. category) of technology are included.

An area 88 is for a time-based filter indicating the time period up to the present time over which the search is restricted, namely last hour, last three hours, last twelve hours, last 24 hours, last week and last month. A dashed box around twelve hours indicates that this period has been selected.

A tabs bar 89 shows various filter options that provide restrictions on the activity measurement module 200. Some illustrated tabs are for filtering according to the source social media platform, such as Facebook, Twitter and Reddit, where the activity has taking place. Another illustrated tab is by "Influencers." Finally, the selected tab, which is the one currently selected as schematically illustrated by the bold highlighting, is for "Stories." The "Stories" tab is also the one relevant for the story and entity ranking approach described above.

An input field 81 is also provided which, from a drop down list, allows the stories to be sorted by most recent, social media source (e.g. "Facebook"), highest velocity (e.g., stories sorted by trending of interactions—for example change measurements or other activity measurements as described herein), engagement type (e.g. "Tweets" or "Facebook Shares") or combined social network sources (e.g. "Facebook+Twitter+Pinterest").

A navigation panel 83 shows the entity ranking results by each of the four standard entity categories: organizations, persons, locations or other text elements, which on the dashboard are labelled: Organizations, People, Places and Misc. The entity ranking list for each category, as obtained by the methods and system components described above is also illustrated, for example for locations: Berlin, San Francisco, Tokyo, Dublin, LA, and London. In the embodiment shown, Berlin is the location entity with the highest entity ranking score, San Francisco the second highest and so forth.

On the left hand side, there is a column 85 that allows location-based category filters, labeled, for example, with categories, such as WORLD, NORTH AMERICA, EUROPE and the like. Adjacent thereto, another column 87 for topic-based category filters labeled, for example, with topics such as, NEWS, CULTURE, SPORT, and the like. The TECH category is shown as currently selected, which also causes various sub-categories to be displayed, such as APPS, CLOUD, and the like, thereby allowing the filter to be further specified to look only under one of these sub-categories. Underneath the navigation panel 83, there appears a ranked list of news stories in individual story cards, with the top ranking story card appearing at 891, the second ranked story card at 892, the third ranked story card at 893 and so forth, with lower ranking stories being found by scrolling down. Each story card 89*n* has a thumbnail picture 91*n*, a headline 92*n*, a story summary text 93*n* and an information panel 94*n*. The information panel contains details about the origin of the news story, for example as shown: a hyperlink to the home page of the news story source's website, an indication of the age of the news story and the name of the author. Other information, such as the country of origin of the news story could also be given, e.g. with a logo of the relevant national flag.

The user interface 30 has been described using the example of a dashboard suitable for a personal computer, as this is an amenable form for the purpose of explanation. Similar graphical user interfaces with a dashboard format can also be provided as a mobile app, e.g. for Android or iPhone operating systems, where the term "mobile app" refers primarily to a module of applications software capable of running on a smart phone or tablet device or other client computer. Other types of user interface can also be provided. An alternative user interface type is an application programming interface (API), which is the type of user interface which would be suitable for developers who wish to integrate the system as described herein with a third party software application, e.g. to incorporate outputs from the trending unit 20 in a flexible manner suited to the third party applications software which is being integrated. Another user interface type would be a report writing software application, which, based on user filters and controls similar to those described above with reference to the dashboard, will output a tailored report, either in the form of publishing software application which prepares and outputs a type-set digest of the news stories in a convenient-to-read form, or the same information output in a format suitable for automatic input and processing by another software product, for example plain text for a publishing program, such as LaTeX.

It will thus be understood that certain implementations of the user interface 30 will have the ability to configure settings in the trending unit 20 as illustrated by the communications path between the user interface 30 and the trending unit 20, for example, in the story scoring module 300 and/or the entity scoring module 400. In addition, certain implementations of the user interface 30 will have the ability to reach through into the data collection unit 10 and extract news story data selected by the trending unit 20 based on the configuration of the user interface unit 30 as also illustrated by a communications path between these two units in FIGS. 1A and 1B.

The stories are ranked and shown in ranking order on the story cards according to the story score. In the embodiment, as shown in FIG. 11, the time filter in area 88 is configured to show all of the ranked stories in the selected time period (e.g., the last 12 hours). The navigation panel 83 of the user interface 30 is also configured to show the entity rankings showing the trending entities in the stories.

In an embodiment, a user can pre-define a panel to filter stories by a specific set of user-defined criteria, which will typically include keywords and categories, but could also include domains, entities or other criteria. By applying these criteria as well as the time filter, a group of news stories can be identified. Trending entities that have been extracted and ranked as described herein can also be shown.

In an embodiment, the user interface 30 is configured to allow a user to use the named entities as a filter for the stories. For example, in an embodiment, the user can click on the navigation panel to select a particular entity of interest, e.g. Berlin, then the interface filters out and does not display stories that fail to mention that entity, i.e. Berlin. Additionally, if the user has entered something into the search entry box 82, then keywords, for example, any entities mentioned in the search text, are used as filters. In other words, news stories that mention multiple entities entered into the search entry box will be given a higher ranking than those that mention only one.

In another embodiment, the system can be configured to allow a user to apply pre-defined user criteria such that if the user has not specified any of the entities in the navigation panel, then the story cards only show stories that contain a reference to at least one top ranking entity. For example, the story ranking list can be weeded to remove all stories that do not mention one of the top 10 ranked entities. However, in other embodiments, the system 100 can be configured to show entity rankings trending entities in the stories without filtering ranked stories that do not include any ranked entities—i.e. showing all ranked stories regardless of whether they include a named entity or not. In either embodiment, the system 100 can be configured to allow a user to proactively use named entities as a filter, for example by clicking on the named entity in the ranking as described above.

The operation of certain aspects of the present disclosure have been described with respect to flowchart illustrations. In at least one embodiment, processes described in conjunction with FIGS. 1-7, can be implemented by and/or executed on a single network computer. In other embodiments, these processes or portions of these processes can be implemented by and/or executed on a plurality of network computers. Likewise, in at least one embodiment, processes or portions thereof, can operate on one or more client computers, such as client computer. However, embodiments are not so limited, and various combinations of network computers, client computers, virtual machines, or the like can be used. Further, in at least one embodiment, the processes described in conjunction with the flowchart illustrations can be operative in system with logical architectures, such as those described in herein.

It will be understood that each block of the flowchart illustrations described herein, and combinations of blocks in the flowchart illustrations, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the present disclosure.

Accordingly, blocks of the flowchart illustrations support combinations for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions. The foregoing examples should not be construed as limiting and/or exhaustive, but rather, as illustrative use cases to show an implementation of at least one of the various embodiments of the present disclosure.

The invention claimed is:

1. A method for processing of one or more digital content objects, each digital content object including a natural language element, the method being performed by a computer system that comprises one or more processors and a computer-readable storage medium encoded with instructions executable by at least one of the processors and operatively coupled to at least one of the processors, the method comprising:
   collecting one or more digital content objects from at least one digital content object source, wherein the at least one digital content object source is a news story source and the one or more digital content objects include digitally published news stories;
   collecting social media activity data from at least one social network;
   determining one or more object scores on a per object basis for the one or more digital content objects with an object scoring module, the object scoring module including machine readable object scoring code which, when executed on the computer, determines on a per object basis an object score for each digital content object, wherein the object score is based on a value of at least one social media activity metric for the social media activity data associated with the digital content object on the at least one social network;
   executing a named entity recognition (NER) classifier to extract on a per object basis one or more named entities that appear in each digital content object through analysis of its natural language element;
   inputting the object scores determined by the object scoring module into an entity scoring module, the entity scoring module comprising machine readable entity ranking code;
   inputting the named entities extracted on a per object basis by the NER classifier into the entity scoring module; and
   executing the entity ranking code to:
      calculate on a per entity basis an entity score that aggregates the object scores of those digital content objects in which that named entity appears; and
      sort the entity scores to provide an entity ranking list; and
   outputting the entity ranking list from the entity scoring module to a user interface.

2. The method of claim 1, further comprising:
   determining on a per object basis an object score for each of a plurality of digital content objects from a batch of the digital content objects; and
   inputting into the entity scoring module, for each of the batch of digital content objects, the object scores determined by the object scoring module.

3. The method of claim 1, further comprising:
   excluding the named entities from the entity ranking list that appears in no more than a threshold number of the digital content objects.

4. The method of claim 1, further comprising:
   determining one or more current object scores for a current time frame;
   calculating the one or more current entity scores;
   determining one or more historical object scores from a preceding time frame;
   calculating the one or more historical entity scores; and
   calculating an entity trend score on a per entity basis from the current entity score for the entity and the historical entity score for the entity, the entity trend score being calculated to measure a trend between the current time frame and the preceding time fame.

5. The method of claim 1, further comprising merging entity names that refer to a same entity.

6. The method of claim 1, wherein the natural language elements of the one or more digital content objects include a summary portion and a main body portion, and the extracting step is based solely on the summary portion.

7. The method of claim 1, wherein the social media activity metric is one or more selected from the group of: a share, a like, a comment, a tweet of a hyperlink, a retweet of a hyperlink, and an aggregate engagement metric for different social media activity metrics.

8. The method of claim 1, wherein the object score is based on size of the social media activity metric over a defined period of time.

9. The method of claim 1, wherein the entity score that aggregates the object scores comprises:
   a sum of the object scores of those digital content objects in which the same named entity appears.

10. The method of claim 9, wherein the sum of the object scores is divided by a number of the digital content objects in which the named entity appears.

11. The method of claim 9, wherein the sum of the object scores is divided by a sum of all the object scores for the digital content objects scored in a predetermined time period.

12. The method of claim 1, wherein the entity ranking list from the entity scoring module is filtered by a filtering parameter.

13. The method of claim 1, wherein the entity ranking list is confined to a maximum number of entities.

14. The method of claim 1, further comprising:
   determining one or more current object scores for a current time frame;
   calculating the one or more current entity scores;
   determining one or more historical object scores from a preceding time frame;
   calculating the one or more historical entity scores;
   calculating an entity trend score on a per entity basis from the current entity score for the entity and the historical entity score for the entity, the entity trend score being calculated to measure a trend between the current time frame and the previous time fame; and
   sorting the entity trend scores to provide the entity ranking list.

15. The method of claim 14, wherein the calculating the entity trend score comprises: dividing the current entity score for the entity by the preceding entity score for the entity.

16. The method of claim 1, further comprising:
   receiving one or more additional digital content objects;
   determining one or more additional object scores on a per object basis for the one or more digital content objects;
   inputting the one or more additional object scores determined by the object scoring module into the entity scoring module;

extracting on a per object basis one or more named entities that appear in each additional digital content object through analysis of its natural language element with the NER classifier;

inputting the one or more additional object scores determined by the object scoring module into the entity scoring module; and executing the entity ranking code to:
recalculate on a per entity basis an entity score that aggregates the object scores of the digital content objects in which that named entity appears;
sort the entity scores to provide an updated entity ranking list; and
output the updated entity ranking list from the entity scoring module.

17. The method of claim 16, further comprising:
recalculating one or more of the object scores that were determined by the object scoring module before receiving the one or more additional object scores;
inputting the one or more recalculated object scores determined by the object scoring module into the entity scoring module; and
executing the entity ranking code to update the previously determined object scores with the recalculated object scores before recalculating the entity score.

18. The method of claim 1, further comprising:
the NER classifier being included in a parsing engine or the entity ranking module.

19. A computer system for analyzing digital content objects, each digital content object including a natural language element, the computer system comprising:
a data collection unit configured to collect social media activity data from social media platforms and a plurality of digital content objects from digital content object sources, wherein the digital object sources include news story sources and the plurality of digital content objects include digitally published news stories;
a trending unit configured to analyze the plurality of digital content objects with an object scoring module and an entity scoring module;
an (NER) classifier configured to extract on a per object basis one or more named entities that appear in each digital content object through analysis of its natural language element; and
an operative connection to a user interface unit, wherein:
the object scoring module includes machine readable object scoring code which, when executed on the computer system, determines on a per object basis an object score for each of the digital content objects, wherein the object score is based on a value of at least one social media activity metric for the social media activity data associated with that digital content object in at least one social network; and
the NER classifier executes code configured to extract on a per object basis one or more named entities that appear in each digital content object through analysis of its natural language element;
wherein the entity scoring module includes machine readable entity scoring code which, when executed on the computer system,
receives the object scores determined by the object scoring module;
receives the named entities extracted on a per object basis;
determines on a per entity basis an entity score that aggregates the object scores of the digital content objects in which that named entity appears;
sorts the entity scores to provide an entity ranking list; and
outputs the entity ranking list.

20. The computer system of claim 19, wherein the user interface unit includes user-configurable trending filters that permit users to:
adjust how object scores and entity scores are determined; or
define a batch of digital content objects to be analyzed by the trending unit; or both.

21. The computer system of claim 19, wherein the NER classifier is included in a parsing engine of the data collection unit or an entity ranking module.

22. A computer program product containing machine-readable code, which when executed on a computer system is operable to analyze a batch of digital content objects by natural language processing, each digital content object including a natural language element, the machine-readable code comprising:
object scoring code which, when executed on a computer system, determines on a per object basis an object score for each of the digital content objects in the batch, wherein the object score is based on a value of at least one social media activity metric associated with that digital content object in at least one social network;
an NER classifier which, when executed on a computer system, executes code configured to extract on a per object basis one or more named entities that appear in each digital content object through analysis of its natural language element; and
entity scoring code comprising machine readable code which, when executed on a computer system,
receives the object scores determined by the object scoring code;
receives the named entities extracted on a per object basis by the NER classifier;
determines, on a per entity basis, an entity score that aggregates the object scores of the digital content objects in which that named entity appears;
sorts the entity scores to provide an entity ranking list; and
outputs the entity ranking list.

23. A computer system comprising a trending unit configured for natural language processing, the trending unit comprising:
an object scoring module including machine readable digital content object scoring code which, when executed on the computer system, at least determines on a per object basis an object score for one or more digital content objects from at least one digital content object source, wherein the object score is based on a value of at least one social media activity metric associated with that digital content object in at least one social network, wherein the at least one digital content object source is a news story source and the one or more digital content objects include digitally published news stories;
an NER classifier which, when executed on a computer system, executes code configured to extract on a per object basis one or more named entities that appear in each digital content object through analysis of its natural language element; and
an entity scoring module comprising machine readable code, the entity scoring module code being configured to, when executed on the computer system, at least:
receive the object scores determined by the object scoring module;

receive the named entities extracted on a per object basis by the NER classifier;

determine, on a per entity basis, an entity score that aggregates the object scores of the digital content objects in which that named entity appears; and sort the entity scores to provide an entity ranking list.

24. The computer system of claim 23, wherein the trending unit further comprises:

the object scoring module including machine readable digital content object scoring code which, when executed on the computer system, at least determines one or more additional object scores on a per object basis for one or more additional digital content objects, wherein the entity ranking module is configured to receive the one or more additional object scores determined by the object scoring module into the entity scoring module, an NER classifier which, when executed on a computer system, executes code configured to extract on a per object basis one or more named entities that appear in each digital content object through analysis of its natural language element; and the entity ranking module code being configured to, when executed on the computer system, at least:

(i) receive the named entities extracted on a per object basis by the NER classifier;

(ii) calculate on a per entity basis an entity score that aggregates the object scores of the digital content objects in which that named entity appears;

(iii) sort the entity scores to provide an updated entity ranking list; and (iv) outputting the updated entity ranking list from the entity scoring module.

25. The computer system of claim 24, wherein the trending unit further comprises:

the entity scoring module code being configured to, when executed on the computer system, recalculate one or more of the previously determined object scores and input the one or more recalculated object scores determined by the object scoring module into the entity scoring module; and the entity ranking module code being configured to, when executed on the computer system, update the previously determined object scores with the recalculated object scores before recalculating the entity score.

26. The method of claim 11 wherein the predetermined time period includes a current time frame and a preceding time frame, the method further comprising:

determining one or more current object scores for the current time frame;

calculating the one or more current entity scores;

determining one or more historical object scores from the preceding time frame;

calculating the one or more historical entity scores;

calculating an entity trend score on a per entity basis from the current entity score for the entity and the historical entity score for the entity, the entity trend score being calculated to measure a trend between the current time frame and the previous time fame; and sorting the trend entity scores to provide the entity ranking list.

* * * * *